(12) United States Patent
Edwards et al.

(10) Patent No.: US 9,125,288 B2
(45) Date of Patent: Sep. 1, 2015

(54) ION-MODE PLASMA CONTAINMENT

(75) Inventors: W. Farrell Edwards, Logan, UT (US); Eric D. Held, Logan, UT (US); Ajay K. Singh, Logan, UT (US)

(73) Assignee: Utah State University, North Logan, UT (US)

( * ) Notice: Subject to any disclaimer, the term of this patent is extended or adjusted under 35 U.S.C. 154(b) by 267 days.

(21) Appl. No.: 13/882,286

(22) PCT Filed: Nov. 8, 2011

(86) PCT No.: PCT/US2011/059782
§ 371 (c)(1),
(2), (4) Date: Apr. 29, 2013

(87) PCT Pub. No.: WO2012/064738
PCT Pub. Date: May 18, 2012

(65) Prior Publication Data
US 2013/0221845 A1 Aug. 29, 2013

Related U.S. Application Data

(60) Provisional application No. 61/410,978, filed on Nov. 8, 2010.

(51) Int. Cl.
*H01J 7/24* (2006.01)
*H05H 1/18* (2006.01)
*G21B 1/05* (2006.01)
*H05H 1/12* (2006.01)

(52) U.S. Cl.
CPC .. *H05H 1/18* (2013.01); *G21B 1/05* (2013.01); *H05H 1/12* (2013.01); *Y02E 30/122* (2013.01); *Y02E 30/126* (2013.01)

(58) Field of Classification Search
CPC ................ H01J 7/24; H05H 1/05; H05H 1/24
USPC ......... 315/39.55, 34, 111.21, 111.41, 111.51, 315/111.71
See application file for complete search history.

(56) References Cited

U.S. PATENT DOCUMENTS 4,267,488 A  5/1981  Wells
4,274,919 A  6/1981  Jensen et al.
(Continued)

OTHER PUBLICATIONS

PCT/US2011/059782 International Search Report and Written Opinion mailed Jun. 29, 2012.
(Continued)

*Primary Examiner* — Hai L Nguyen

(57) ABSTRACT

For ion-mode plasma containment, a toroidal vacuum vessel (322) has a major radius (208) and a minor radius (212). The toroidal vacuum vessel (322) is filled with a gas (391) having an initial particle density. An ionizing device (341) ionizes the gas (391) into a plasma (400). A transformer inductively (326) drives a toroidal particle current (332) comprising an ion current and an electron current about a toroidal axis. The toroidal particle current (322) heats the plasma (400) and generates a poloidal magnetic field (373). Field coils (414) wound poloidally about the toroidal vacuum vessel (322) generate a toroidal magnetic field (371). The toroidal magnetic field (371) at a wall of the toroidal vacuum vessel (322) is adjusted to satisfy a boundary condition for a minimum-energy. The plasma (400) is contained by the radial electric field, the poloidal magnetic field (373), and the toroidal magnetic field (371) within the toroidal vacuum vessel (322) in the minimum-energy state.

14 Claims, 22 Drawing Sheets

(56) References Cited

U.S. PATENT DOCUMENTS

| | | |
|---|---|---|
| 4,548,782 A | 10/1985 | Manheimer et al. |
| 5,868,909 A | 2/1999 | Eastlund |
| 6,441,552 B1 * | 8/2002 | Brandenburg et al. .. 315/111.21 |

OTHER PUBLICATIONS

Edwards, Boyd Farrell, Magnetic Flux Ropes of Venus: Evidence for Restrictions on the Electromagnetic Theory of Collisionless Plasmas, Thesis, Utah State University, Logan, UT 1982.

C.T. Russell, Magnetic Flux Ropes in the Ionosphere of Venus, Department of Earth and Space Sciences and Institute of Geophysics and Planetary Physics, University of California, Los Angeles, CA, 1990, pp. 413-423, Geophysical Monography, No. 58.

W. F. Edwards, et al. Stationary Equilibria of Two Fluid Plasmas having Significant, Internal, Static Electric Fields, Physics Department, Utah State University, Logan, UT, Physical Review Letters 93, Dec. 13, 2004.

* cited by examiner

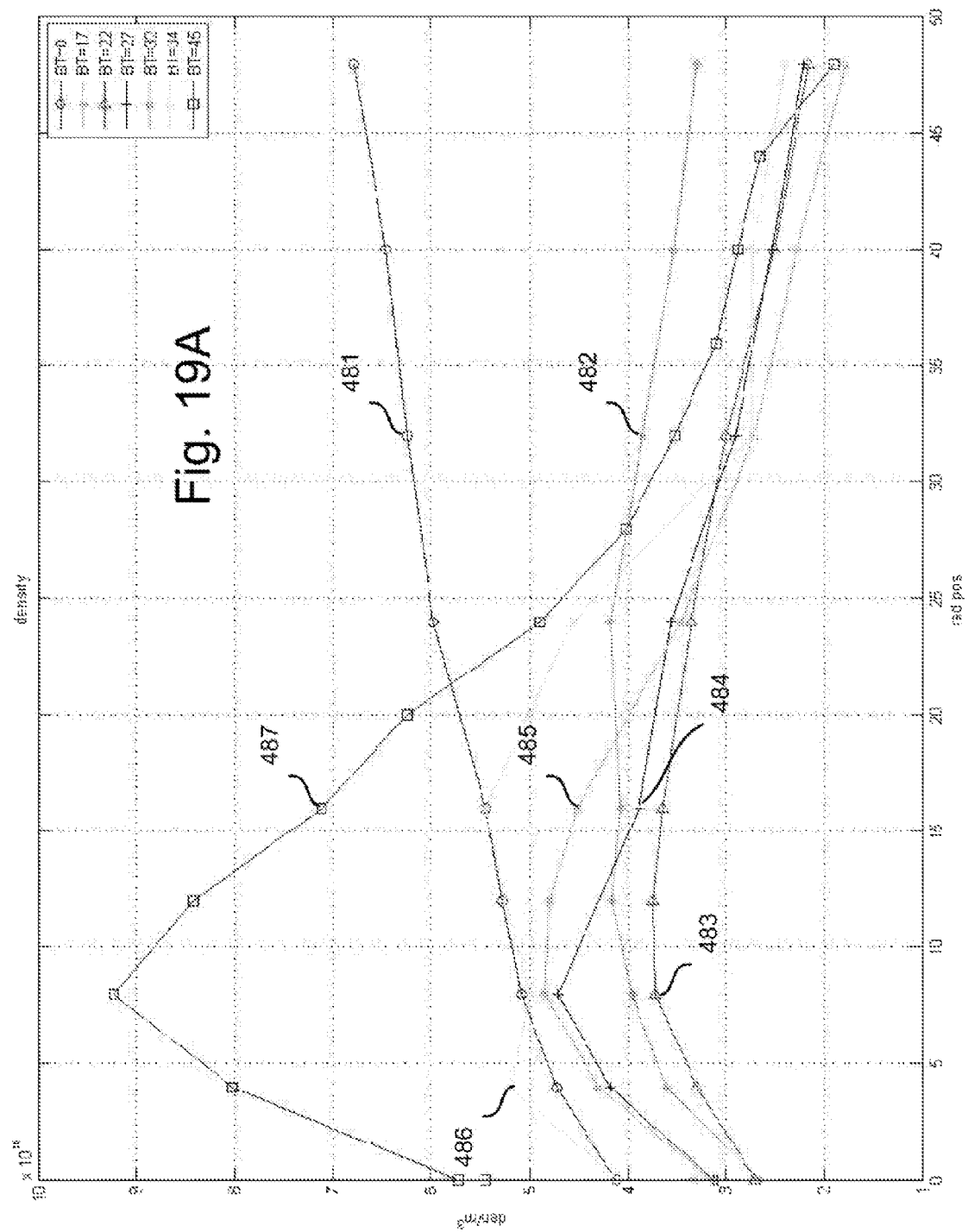

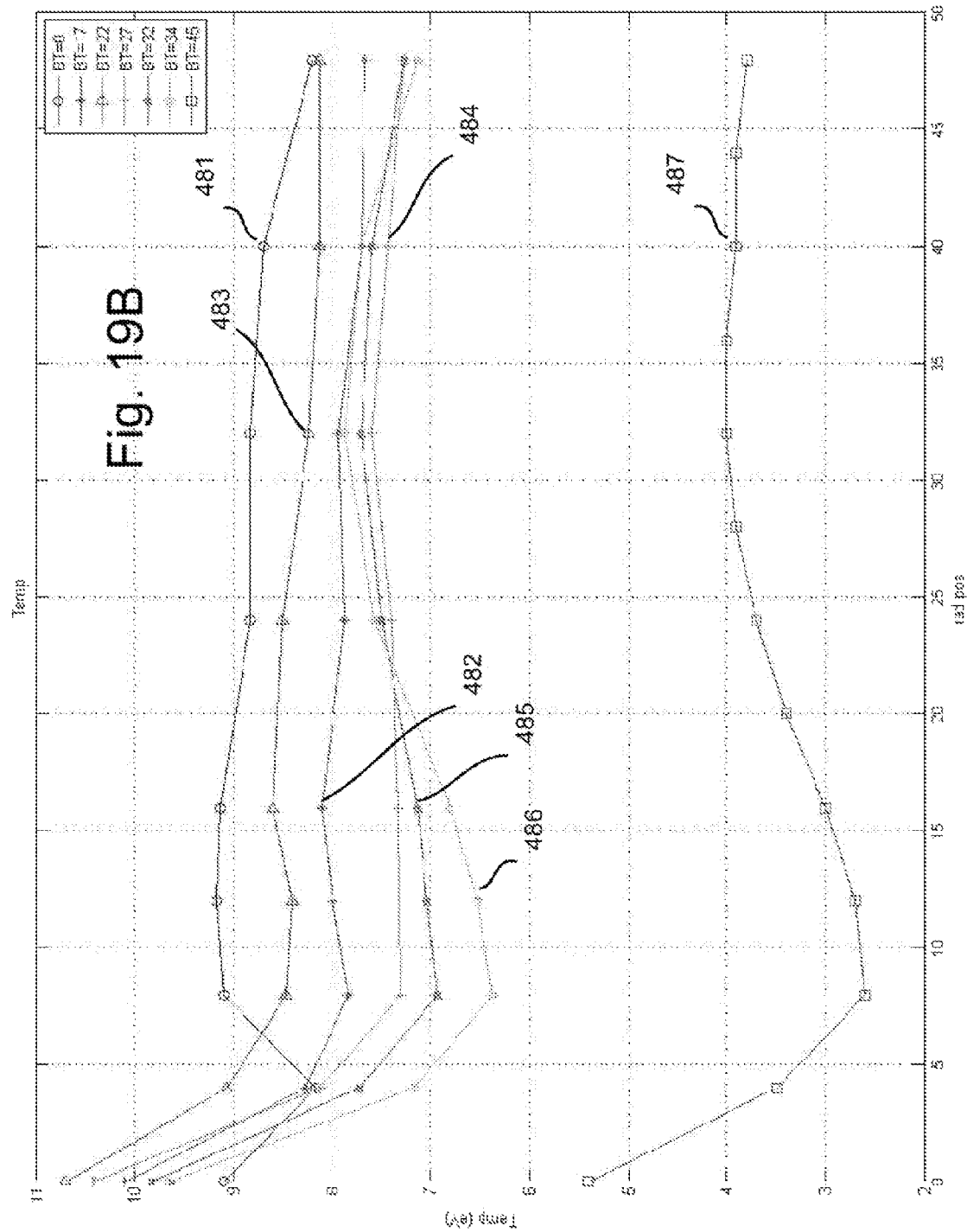

ION-MODE PLASMA CONTAINMENT

CROSS-REFERENCE TO RELATED APPLICATION

This application claims priority to U.S. Provisional Patent Application No. 61410978 entitled "ION-MODE PLASMA CONTAINMENT" and filed on Nov. 8, 2010 for W. Farrell Edwards et al., which is incorporated herein by reference.

FIELD

The subject matter disclosed herein relates to plasma containment and more particularly relates to ion-mode plasma containment.

BACKGROUND

Description of the Related Art

Plasma has a number of important applications. Unfortunately, plasma has been difficult to contain economically.

BRIEF SUMMARY

An apparatus is disclosed for plasma containment. A toroidal vacuum vessel has a major radius R and a minor radius $\alpha$. The toroidal vacuum vessel is filled with a as having, an initial particle density n, where $n=(m\eta^2)/(a^2\mu_o e^2)$, m is a mass of an ion charge carrier, $\mu_o$ is the permeability of free space, e is the electron charge, and $\eta$ is a constant in the range of 1 to 2. An ionizing device ionizes the gas into a plasma and heats it. A transformer or other induction device inductively drives a toroidal particle current comprising an ion current and an electron current about a toroidal axis. The toroidal particle current generates a poloidal magnetic field. Field coils wound poloidally about the toroidal vacuum vessel generate a toroidal magnetic field. The toroidal magnetic field at a wall of the toroidal vacuum vessel is adjusted to satisfy a boundary condition as required for a minimum-energy state such that ion current conductivity has a free space value and electron current conductivity is reduced by the poloidal magnetic field and the toroidal magnetic field. The plasma ion current increases in response to the electric field developed through transformer action and in response to internal electric fields developed as a result of plasma attaining diamagnetic equilibrium. This ion current generates an increased poloidal magnetic field that motivates the ions radially inward toward the toroidal axis as does the toroidal magnetic field, separating the ions radially inward from the electrons. The ions are contained within an inner boundary and the electrons are contained within an outer boundary, producing a radial electric field within the plasma between the radially inward ions and the radially outward electrons. The plasma is contained by the radial electric field, the poloidal magnetic field and the toroidal magnetic field within the toroidal vacuum vessel in the minimum-energy state with an outer boundary of between 1 and 2 ion depths. A method is disclosed performing the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying, drawings, in which:

FIGS. 19A-B are graphs showing radial density and temperature profiles of plasma for the containment apparatus 320 of FIG. 17;

DETAILED DESCRIPTION

Figure 1:
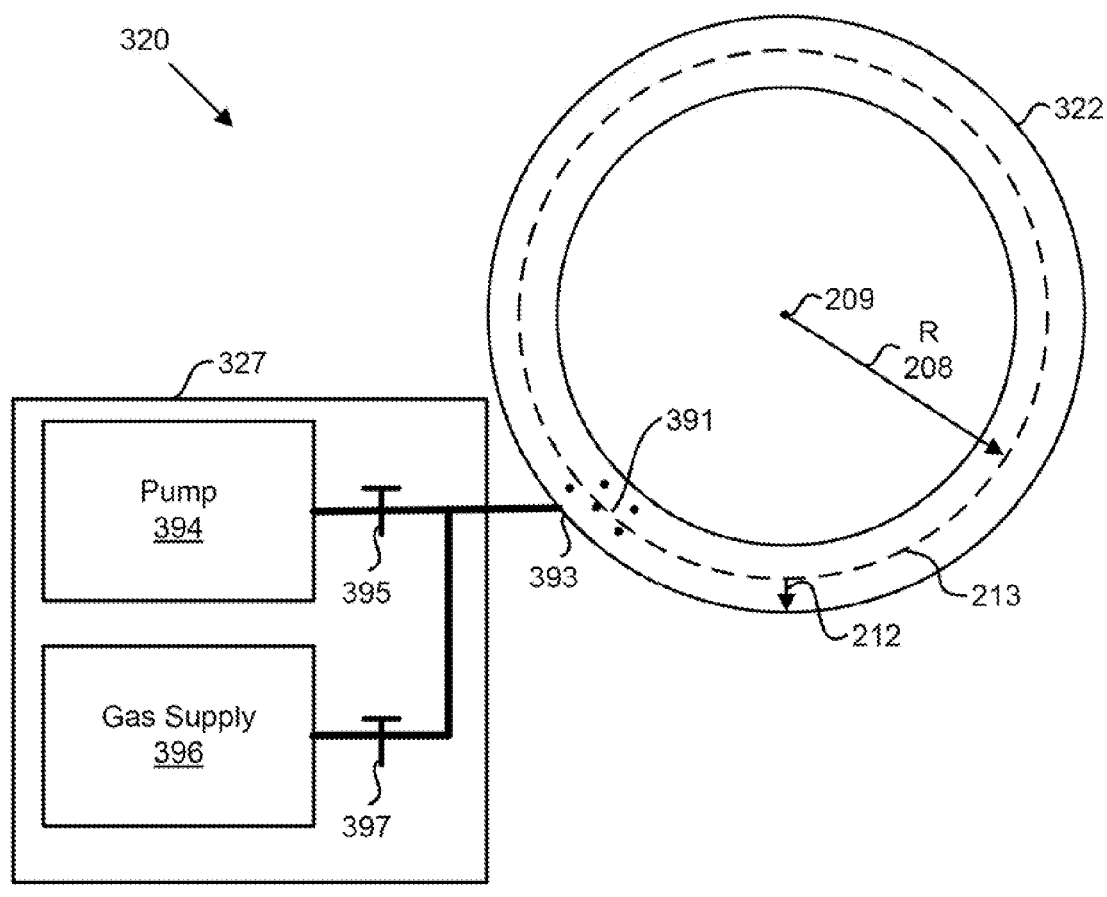
FIG. 1 is a top-view schematic drawing illustrating one embodiment of a containment apparatus.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. One skilled in the relevant art will recognize, however, that embodiments may be practiced without one or more of the specific details, or with other methods, components materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations of apparatuses, systems, and methods according to various embodiments of the present invention. It should also be noted that, in some alternative implementations, the functions noted in the block may occur out of the order noted in the Figures. For example, two blocks shown in succession may, in fact, be performed substantially concurrently, or the blocks may sometimes be performed in the reverse order, depending upon the functionality involved.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment.

The embodiments of the present invention contain a plasma in a minimum energy state as is described in U.S. patent application Ser. No. 11/624,672 entitle "Plasma Containment" and filed on Oct. 28, 2010 by W. Farrell Edwards et at, and which is incorporated herein by reference. The paper "Ion Currents in Minimum-Total-Energy Wuasi-Equilibrium Magnetized Plasmas" by W. F. Edwards, E. D. Held, A. K. Singh, and B. F. Edwards, presented at Plasma Physics Section, American Physical Society, Chicago, Nov. 8, 2010 is also incorporated by reference.

Plasma has a number of uses including generating high-energy particles and producing energy. Unfortunately, producing plasma in certain quantities, at certain temperatures, and for certain durations has been uneconomical because of resulting, plasma instabilities and perturbations. For example, pressure perturbations, wall effects, kinetic effects, and inconsistencies in magnetic and electrical fields used to contain a plasma may prevent the containment of the plasma for a significant duration.

In order to overcome these instabilities and perturbations for significant durations, a favored containment device, the tokamak, has resorted to employing increasingly powerful magnetic fields to contain plasma and prevent the plasma instabilities from causing the plasma to breach the intended limits of plasma containment and often to impact the walls of containment vessels and there lose heat and density; when this happens containment is lost. Alternatively, plasma containment devices have generated plasma for very short durations to minimize the effects of plasma instabilities.

Unfortunately, powerful magnetic fields and other efforts to stabilize plasma often require large scale and costly containment devices. Similarly, short duration/low quantity plasma containment has not been sufficient for many applications, making the containment of plasma at certain temperatures for certain durations impractical.

The embodiments described herein contain plasma in a minimum-total-energy state—often hereafter designated "minimum-energy state". In general, plasma contained in a minimum-energy state cannot change from the minimum-energy state unless energy is added to the plasma. As a result, in the minimum-energy state, the plasma self-mitigates the pressure perturbations, wall effects, kinetic effects, and inconsistencies in magnetic and electrical fields in order to maintain the minimum energy state.

Plasma in the minimum-energy state can be found in nature. Diamagnetism and flux ropes in the ionosphere of Venus contain plasma in the minimum-energy state, although at kilometer order scales and very low particle densities that would be impractical for use in an earth-bound plasma containment device.

Plasma boundary conditions must satisfy a narrow set of parameters in order to be maintained in the minimum-energy state. In particular, the magnetic field must be low. However, the favored tokamak has been unable to contain plasma for long durations without using high magnetic fields other machines such as the reverse field pinch that use lower magnetic fields fail to achieve commercial success because their containment is not sufficiently long for other reasons—and they also fail to achieve minimum-total-energy equilibrium states. Therefore, the minimum-energy state has not been achieved for significant durations in previous plasma containment and generation devices. The embodiments describe herein an apparatus and method that creates the conditions for containing ion-mode plasma in the minimum-energy state on a scale that is economical and practical. As a result, plasma may be contained in quantities, at temperatures, and for durations that support new practical applications.

FIG. 1 shows a top-view schematic drawing illustrating one embodiment of a containment apparatus 320. The containment apparatus 320 contains plasma in the minimum-total-energy state. Such plasma can be contained without the large magnetic fields and resulting large and expensive hardware required to produce the magnetic fields and to heat the plasma to necessary high temperatures. In addition, the plasma can be contained for significant durations possibly including continuous containment. As a result, the contained plasma can be employed for a variety of previously impractical functions.

The containment apparatus 320 comprises a toroidal vacuum vessel 322 that is a torus in shape and is composed of an insulating material such as PYREX® in order that an externally produced electric field can penetrate through the wall to a plasma disposed in the toroidal vacuum vessel 322. Alternatively, the toroidal vacuum vessel 322 may be composed generally of a conducting material such as stainless steel for improved mechanical strength.

The toroidal vacuum vessel 322 has a major radius 208 from a center point 209 to a toroidal axis 213. The toroidal vacuum vessel 122 further has a minor radius 212 from the toroidal axis 213 to a radius limit defined by a limiter near an inner wall of the toroidal vacuum vessel 322.

The toroidal vacuum vessel 322 may have an opening 393. The opening 393 may be connected to a gas device 327 comprising, a vacuum pump 394, a gas supply 396, a vacuum valve 395, and a gas valve 397. The vacuum valve 395 may control the connection of the vacuum pump 394 to the toroidal vacuum vessel 322. The gas valve 397 may control the connection of the as supply 396 to the toroidal vacuum vessel 322.

In one embodiment, the vacuum valve 395 is opened and the vacuum pump 394 evacuates the toroidal vacuum vessel 322. The vacuum valve 395 may be closed and the gas valve 397 opened to admit a metered amount of gas 391 into the toroidal vacuum vessel 322. The gas valve 397 may be closed to trap the gas 391 within the toroidal vacuum vessel 322.

Figure 2:
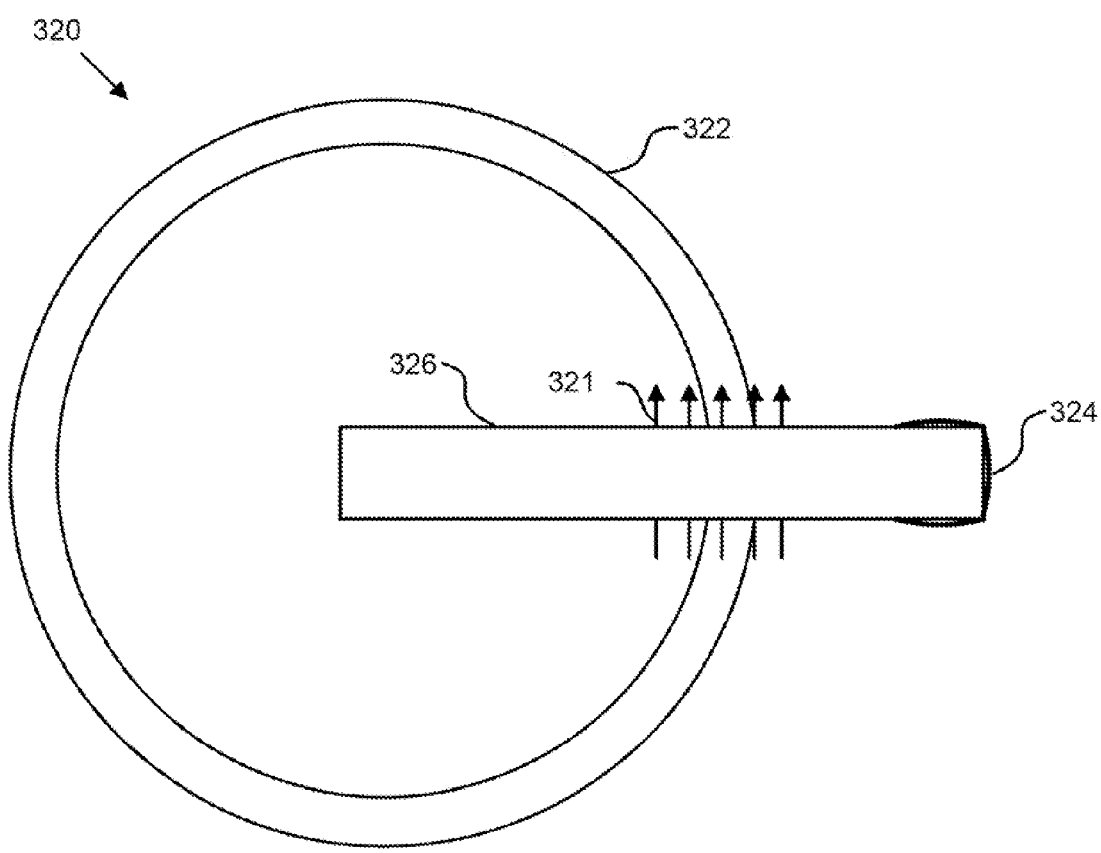
FIG. 2 is a top-view schematic drawing illustrating one embodiment of a containment apparatus.

FIG. 2 is a top-view schematic drawing illustrating one embodiment of a containment apparatus 320. The containment apparatus 320 may be containment apparatus 320 of FIG. 1. For simplicity, some elements of the containment apparatus 320 are not shown. The description of the containment apparatus 320 refers to elements of FIG. 1, like numbers referring to like elements. The containment apparatus 320 comprises the toroidal vacuum vessel 322 magnetically coupled to a primary winding 324 via a transformer 326 or to some other means of establishing an electric field within the plasma and driving toroidal current. Driving a current through the primary winding 324 generates a magnetic field within the toroidal vacuum vessel 322 as will be described hereafter.

Figure 3:
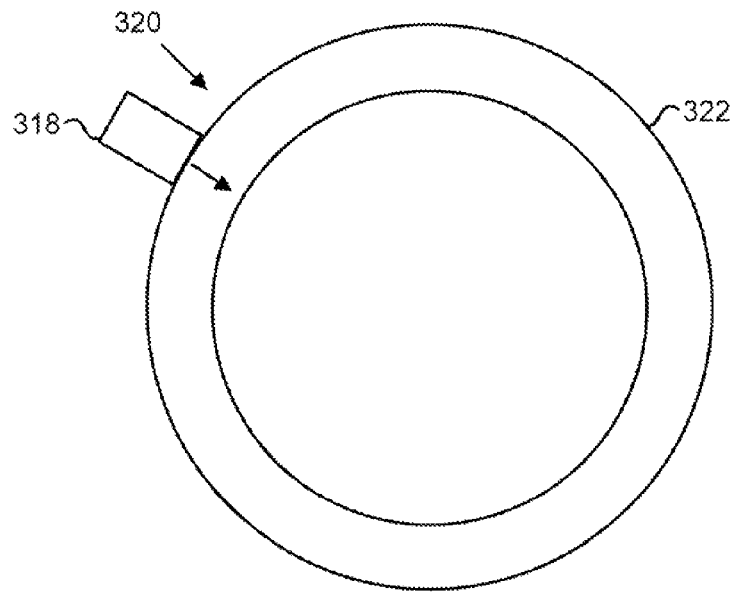
FIG. 3 is a top-view schematic drawing illustrating one embodiment of a containment apparatus with microwave generator.

FIG. 3 is a top-view schematic drawing illustrating one embodiment of a containment apparatus 320. The containment apparatus 320 may be containment apparatus 320 of FIGS. 1-2. For simplicity, some elements of the containment apparatus 320 are not shown. The description of the containment apparatus refers to elements of FIG. 1, like numbers referring to like elements.

A microwave generator 318 is shown disposed to direct electromagnetic radiation at the gas 391 in the toroidal vacuum vessel 322. The microwave generator 318 may ionize and heat the gas 391 in the toroidal vacuum vessel 322 as will be described hereafter.

Figure 4:
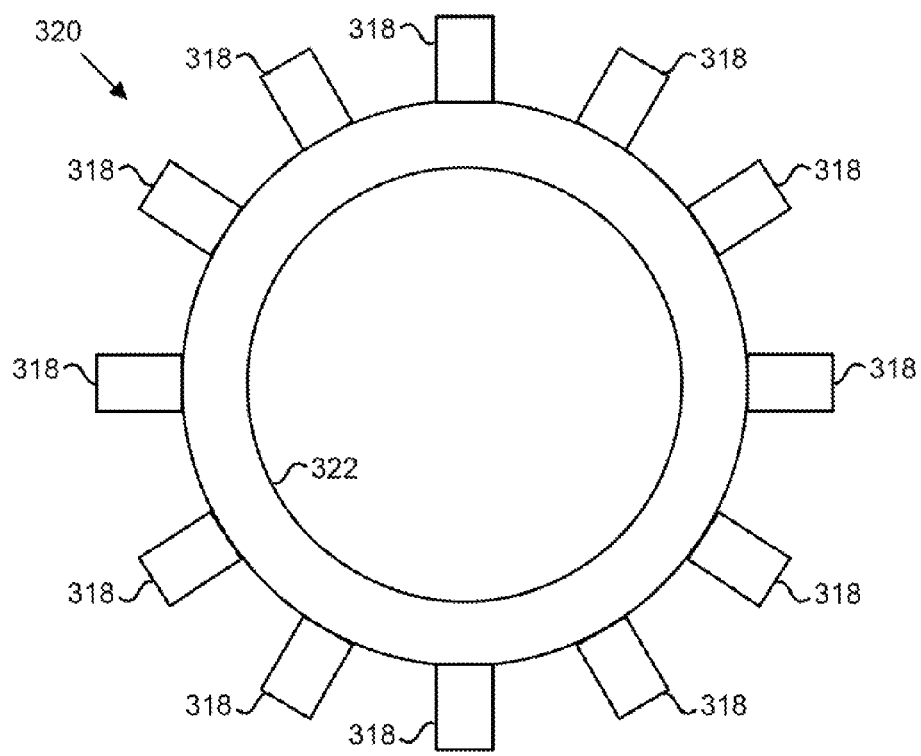
FIG. 4 is a top-view schematic drawing illustrating one embodiment of a containment apparatus with a plurality of microwave generators.

FIG. 4 is a top-view schematic drawing illustrating one embodiment of a containment apparatus 320. The containment apparatus 320 may be containment apparatus 320 of FIG. 1-3. For simplicity, some elements of the containment apparatus 320 are not shown. The description of the containment apparatus 320 refers to elements of FIGS. 1-2, like numbers referring to like elements.

A plurality of microwave generators 318 are shown disposed about the toroidal vacuum vessel 322. The microwave generators 318 may generate power in the range of 0.5 to 2 kilowatt (kW).

Figure 5:
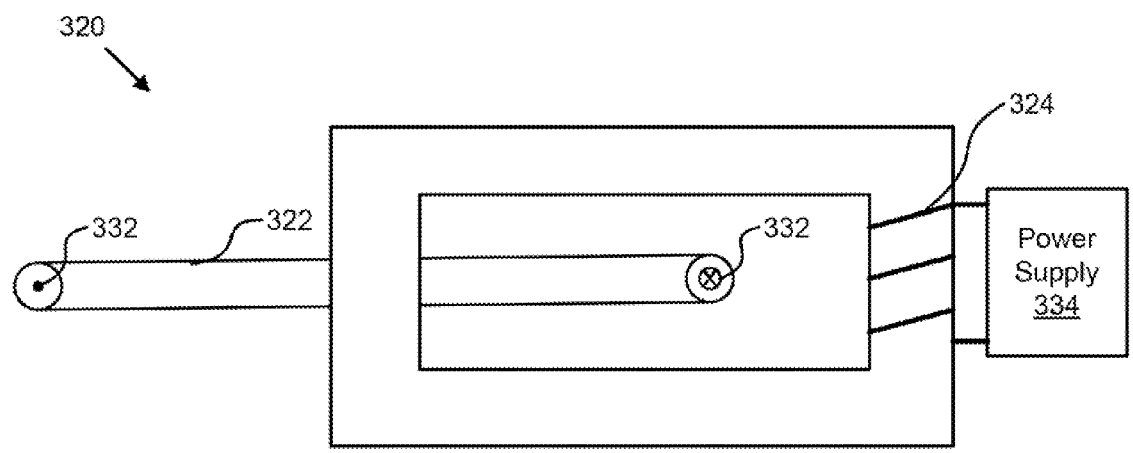
FIG. 5 is a side-view cut-away schematic drawing illustrating one embodiment of a containment apparatus.

FIG. 5 is a side-view schematic drawing illustrating one embodiment of a containment apparatus 320. The containment apparatus 320 may be the containment apparatus of FIGS. 1-2. For simplicity, some elements of the containment apparatus 320 are not shown. The description of the containment apparatus refers to elements of FIGS. 1-4, like numbers referring to like elements. The primary winding 324 is shown connected to a power supply 334. The power supply 334 may supply a current to the primary winding 324 that generates an axial or toroidal electric field 321 $E_t$ along the toroidal axis 213.

Figure 6:
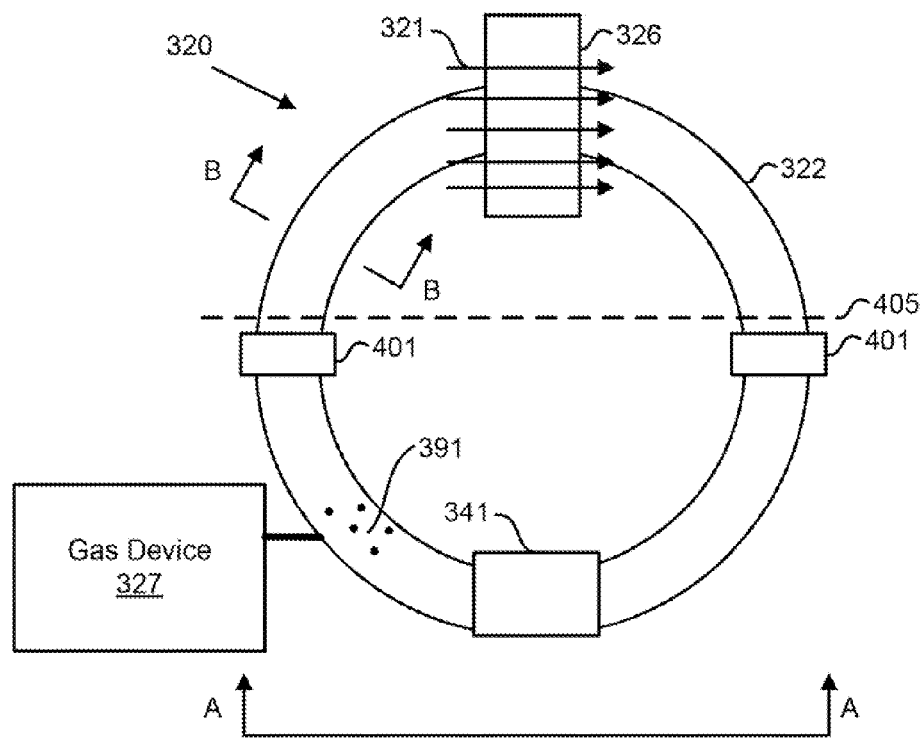
FIG. 6 is a top-view schematic drawing illustrating one embodiment of a containment apparatus.

The FIG. 6 is a top-view drawing of one embodiment of the containment apparatus 320. The containment apparatus 320 may be the containment apparatus 320 of FIGS. 1-5. For simplicity some elements of the containment apparatus are not shown. The description of the containment apparatus 320 refers to elements of FIGS. 1-5, like numbers referring to like elements.

The containment apparatus 320 includes an ionizing device 341 that ionizes and heats the gas 391. The ionizing device 341 may induce and/or apply directly an electric field in the toroidal vacuum vessel 322. For example, the ionizing device 341 may apply a voltage across a small insulating break in the vessel, if conducting, generating a toroidally-oriented electric field. The voltage may be in the range of 2 to 20 V. The electric field may cause a cascade of electrons, at least partially ionizing and heating the gas 391.

In one embodiment, the ionizing device 341 is a glow coil. Alternatively, the ionizing device 341 generates radio waves. In a certain embodiment, the ionizing device 341 is the microwave generator 318. The microwave generator 318 may ionize the gas 391 through radiating electromagnetic waves. The microwave generator may generate 1 kilowatt (kW) of energy.

Figure 16B:
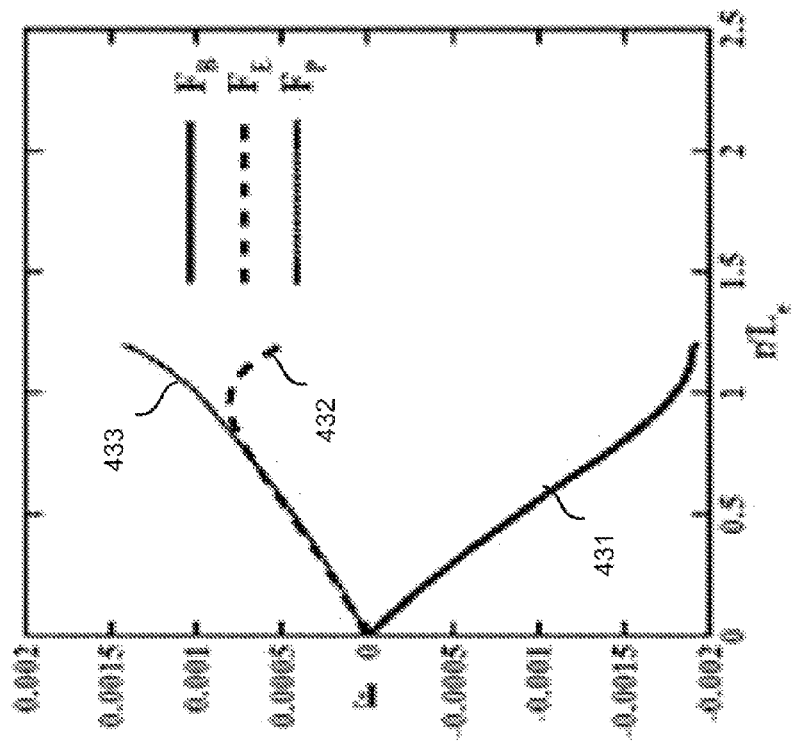
FIG. 16A-B shows graphs of radial electrostatic, magnetic, and thermal forces on electrons and ions in the equilibrium plasma.
Figure 16A:
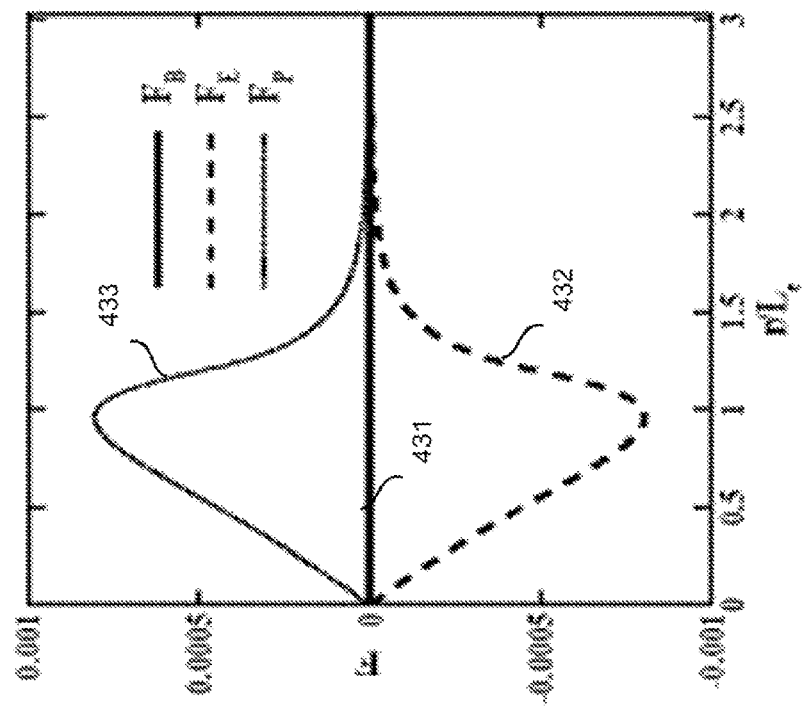

The transformer or similar induction device 326 may inductively drive a toroidal particle current 332 in the plasma by generating the axial or toroidal electric field 321 $E_t$ along the toroidal axis 213 as described in FIG. 16A, The axial electric field 321 may be generated through time-changing magnetic fields of the transformer 326. In order for the axial electric field 321 $E_t$ to appear within the plasma rather than in a conducting wall of the toroidal vacuum vessel 322, insulating breaks including poloidally-oriented breaks 401 and toroidally-oriented breaks may be provided. A first plane 405 is also shown from above. The first plane 405 will be referenced hereafter in FIG. 11.

Figure 7:
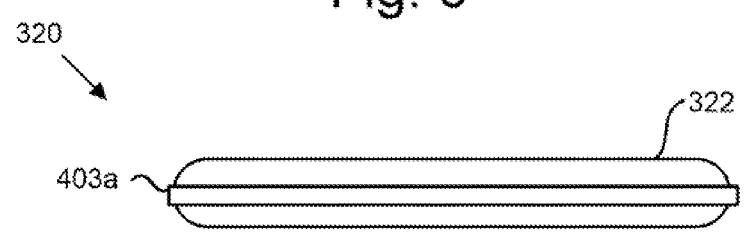
FIG. 7 is a side-view schematic drawing showing one embodiment of a toroidal vacuum vessel.
Figure 8:
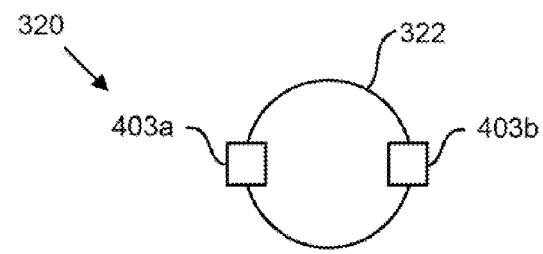
FIG. 8 is a cut-away axial-view drawing showing one embodiment of the toroidal vacuum vessel.

FIG. 7 is a side-view schematic drawing of one embodiment of the toroidal vacuum vessel 322 of FIGS. 1-6. The toroidal vacuum vessel 322 may be the toroidal vacuum vessel 322 of FIG. 6 viewed along the A-A view line. FIG. 8 is a cut-away axial-view drawing of one embodiment of the toroidal vacuum vessel 322 of FIGS. 1-7. The toroidal vacuum vessel 322 may be the toroidal vacuum vessel 322 of FIG. 4 viewed toward a cutaway of the B-B view line.

The poloidally-oriented breaks 401 (FIG. 6) prevent toroidal current from flowing parallel the toroidal axis 213 in a wall of the toroidal vacuum vessel 322 whereas the toroidally oriented breaks 403 (FIGS. 7 and 8) stop poloidal current around the toroidal axis 213 in a wall of the toroidal vacuum vessel 322. The poloidally-oriented breaks 401 and toroidally-oriented breaks 403 separate the toroidal vacuum vessel 322 into four or more conducting pieces so that there is no complete conducting path for either a poloidal or a toroidal current to flow within the wall of the toroidal vacuum vessel 322. Under some circumstances, if the insulting, breaks 401, 403 are not present, the transformer generated magnetic fields may only drive currents within the wall of the toroidal vacuum vessel 322 rather than in the plasma contained therein.

In an alternate embodiment, the toroidal vacuum vessel 322 comprises a conducting material, but has no insulating breaks. Under some circumstances, induction of electric fields in this embodiment is not reduced sufficiently to hamper the operation of the containment apparatus 320. An advantage of this embodiment is that a conducting wall with complete toroidal and poloidal current paths may tend to suppress certain instabilities. If the toroidal vacuum vessel 322 is conducting, the toroidal vacuum vessel 322 may be sufficiently thin that magnetic fields established from outside the vessel can penetrate the toroidal vacuum vessel 322 in a time short with respect to pulse operation time of the containment apparatus 320.

Figure 9:
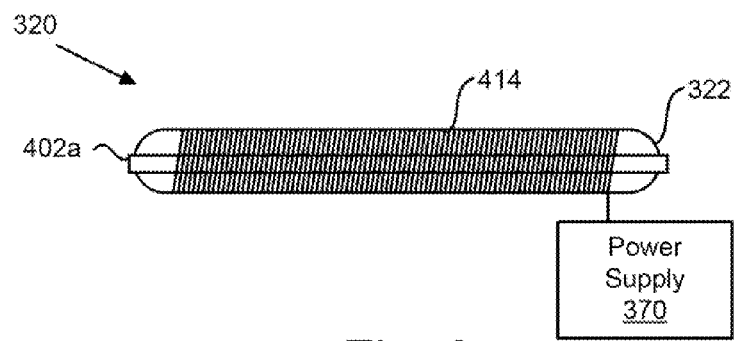
FIG. 9 is a side view drawing of one embodiment of a toroidal vacuum vessel with poloidal field coils.

FIG. 9 is a side view drawing of one embodiment of the toroidal vacuum vessel 322 with poloidal field coils 414. The toroidal vacuum vessel 322 is the toroidal vacuum vessel 322 of FIGS. 1-8. The description of the containment apparatus 320 refers to elements of FIGS. 1-8, like numbers referring to like elements. For simplicity some previously described elements are not depicted.

The field coils 414 are depicted wound around a portion of the toroidal vacuum vessel 322. The field coils 414 may be wound poloidally about the toroidal vacuum vessel 322. In one embodiment, the field coils 414 are wound uniformly around the toroidal vacuum vessel 322. Alternatively, the field coils 414 may be wound intermittently around the toroidal vacuum vessel 322 in a plurality of separate coils. A toroidal power supply 370 may apply a current to the field coils 414 to generate a toroidal magnetic field as will be described hereafter.

Figure 10:
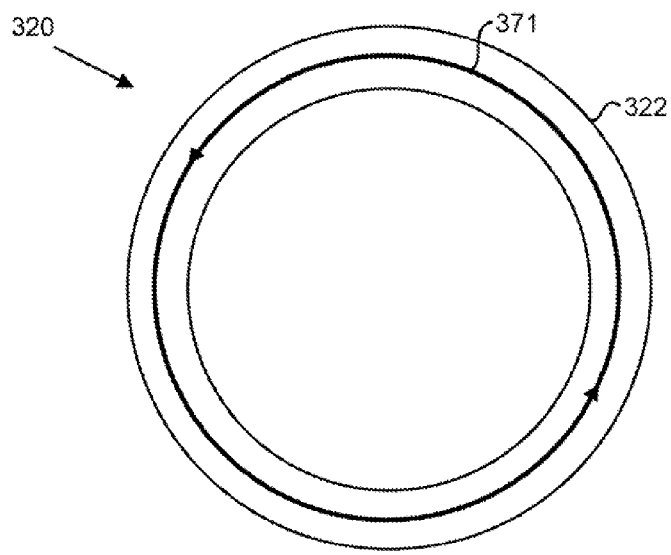
FIG. 10 is a schematic top-view drawing of one embodiment of a toroidal magnetic field in a toroidal vacuum vessel.

FIG. 10 is a schematic top-view drawing of one embodiment of a toroidal magnetic field 371 in the containment apparatus 320. The containment, apparatus 320 is the containment apparatus of claim 1-9. The toroidal magnetic field 371 is depicted within the toroidal vacuum vessel 322 of the containment apparatus 320. For simplicity, some previously described elements of the containment apparatus 320 are not shown. The description of the toroidal magnetic field 371 refers to elements of FIGS. 1-9, like numbers referring to like elements.

The toroidal magnetic field 371 is generated by the field coils 414. In one embodiment, a current from the toroidal power supply 370 is applied to the field coils 404 to generate the toroidal magnetic field 371.

Figure 11:
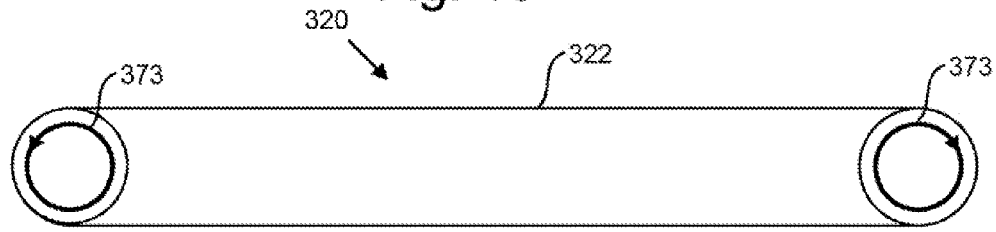
FIG. 11 is a schematic cutaway drawing of one embodiment of the poloidal magnetic field.

FIG. 11 is a schematic cutaway drawing of one embodiment of a poloidal magnetic field 373. The containment device 320 may be the containment device 320 of FIG. 6 cutaway along the first plane 405 viewed along the A-A axis. The poloidal magnetic field 373 is shown about the toroidal vacuum vessel 322 of the containment apparatus 320. For simplicity, some previously described elements of the containment apparatus 320 are not shown. The description of the poloidal magnetic field 373 refers to elements of FIGS. 1-10, like numbers referring to like elements.

In one embodiment, the transformer 326 generates the axial electric field 321. The axial electric field 321 inductively drives the particle current 332 about the toroidal axis 213. The particle current 332 may include both electrons of the gas 391 and ions of the gas 391 carrying the particle current 332. The particle current 332 generates the poloidal magnetic field 373.

Figure 12:
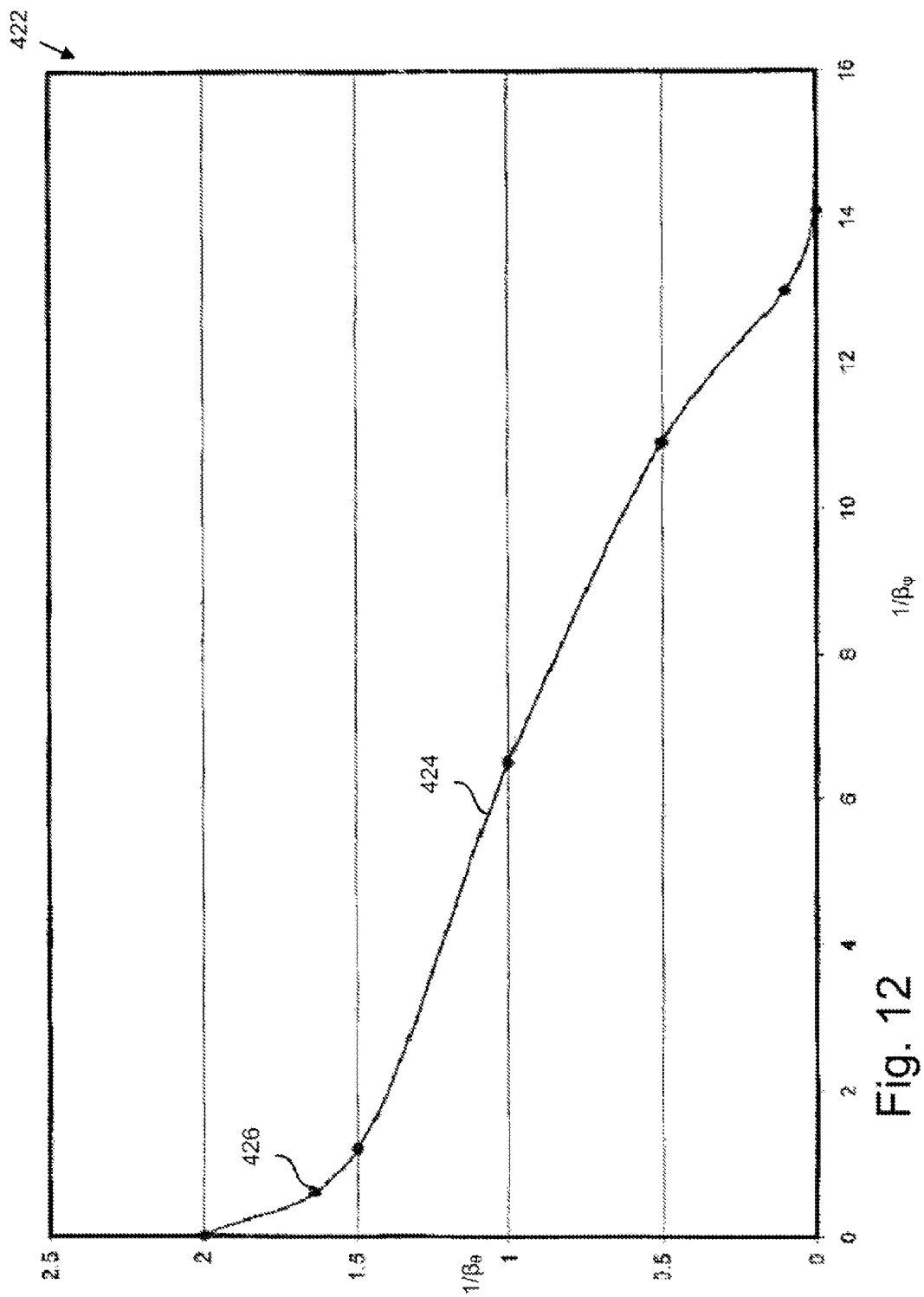
FIG. 12 is a graph showing a toroidal/poloidal minimum-energy state relationship.

FIG. 12 is a graph 422 showing a toroidal/poloidal magnetic field relationship for the boundary condition for entering the minimum-energy state relationship. The toroidal/poloidal magnetic field relationship must be satisfied at the limit of the containment volume near the wall of the toroidal vacuum vessel 322 for the plasma to enter the minimum-energy state. The toroidal/poloidal magnetic field relationship shows the values of an inverse of a poloidal beta value $1/\beta_\theta$ of the poloidal magnetic, field 373 and an inverse of a toroidal beta value $1/\beta_\phi$ of the toroidal magnetic field 371 at the boundary of the plasma from which the minimum-energy state is entered. The description of the toroidal/poloidal minimum-energy state relationship refers to elements of FIGS. 1-11, like numbers referring to like elements.

A scale length of current carrying species $\Lambda$ is defined by Equation 1, where c is the speed of light, $n_0$ is an initial number of particles, $\omega_p$ is the plasma frequency, m the mass of the current-carrying species, whether ion or electron, e the electronic charge, and $\mu_o$ the permeability of free space.

$$\Lambda = c/\omega_p = [m/(\mu_o n_o e^2)]^{1/2} \quad \text{Equation 1}$$

To achieve the minimum-energy state, the minor radius 212 of the containment volume of the toroidal vacuum vessel 322 may be equal to or greater than a scale length, $\Lambda$, as shown in Equation 1, where $\eta$ is greater than or equal to 1. The minor radius 212 of the toroidal vacuum vessel may be defined by limiters placed in the plasma or it may be defined as extending to the wall of the containment vessel.

$$\alpha = \eta \Lambda \quad \text{Equation 2}$$

As $\eta$ becomes larger stability becomes less robust. With this factor much larger than ~2 the system is expected to be unstable to multiple filamentation. In one embodiment, $\eta$ is in the range of 1 to 2. In a certain embodiment, $\eta \sim 1.6$.

The toroidal $\beta_\phi$ and poloidal $\beta_\theta$ beta values represent the ratio of net thermal energy of the electrons and ions to the energy in the toroidal component of the magnetic field 371 and poloidal component of the magnetic field 373 respectively within the toroidal vacuum vessel 322 as expressed in Equations 3 and 4.

$$\beta_\theta = 2\mu_o(2n_o k T_o)/B_\theta^2 \quad \text{Equation 3}$$

$$\beta_\phi = 2\mu_o(2n_o k T_o)/B_\phi^2 \quad \text{Equation 4}$$

The factor 2 within the brackets results from assuming, that the thermal energies of electrons and ions in the plasma are approximately equal. That factor will be different if the temperatures of the two species, electron and ion, differ. For Z-pinch cases with no toroidal magnetic field ($1/\beta_\phi = 0$), solutions of the minimum-energy equations establish that $\beta_\theta$ must be near 2.0. For theta pinch with no poloidal magnetic field, ($1/\beta_\theta = 0$) $\beta_\phi$ must have a value of approximately 1/14 or less, depending slowly on the value of $n_o$ and $T_o$. For screw-pinch, $\beta_\theta$ and $\beta_\phi$ are interrelated.

A minimum-energy state boundary conditions are satisfied for the inverse beta value $1/\beta_\phi$ of the toroidal magnetic field 371 and the inverse beta value $1/\beta_\theta$ of the poloidal magnetic field 373 where $\beta_\theta$ and $\beta_\phi$ are as given in Equations 3 and 4 where n is the particle density, e is the electron charge, T is the temperature, $\mu_0$ is the permeability of free space, and B is the magnetic field. The toroidal/poloidal minimum-energy state relationship must be satisfied for plasma to enter and be confined in the minimum-energy state.

In the depicted embodiment, the curve 424 is calculated for $n=1\times10^{19}/m^3$, kT=100 eV, and a minor radius 212 of 2.5 mm. The curve 424 is obtained by repeatedly solving the minimum-energy set of differential equations using different input values of toroidal magnetic field $B_\theta$ 371 and poloidal magnetic field $B_\phi$ 373. As seen in graph 422, for screw-pinch confinement that remains near a Z pinch, for example, at point 426, $1/\beta_\theta$ may be 1.7 and $1/\beta_\phi$ may be 0.5. This provides enough $\theta$ pinch to give the added stability that is expected from screw pinch. Other beta values will be obtained under different conditions, but under all conditions, $1/\beta_\phi$ is between 0 and 3 and $1/\beta_\theta$ between 0 and 30 to reach the minimum-energy state.

From the graph 422 it is evident that the relationship between the reciprocal beta values $1/\beta_\theta$ and $1/\beta_\phi$ is approximately linear. The relationship between the reciprocal beta values $1/\beta_\theta$ and $1/\beta_\phi$ that must be present at the boundary such as a limiter or wall of the toroidal vacuum vessel 322 may be expressed by Equation 5, where $\beta_\phi(0)$ is the value of $\beta_\phi$ when $\beta_\theta=0$ and $\beta_\theta(0)$ is the value of $\beta_\theta$ when $\beta_\phi=0$.

$$[1/\beta_\phi]/[1/\beta_\phi(0)] + [1/\beta_\theta)]/[1/\beta_\theta(0)] = 1 \quad \text{Equation 5}$$

In one embodiment, $1/\beta_\phi(0)$ is greater than 0 and less than 3, $1/\beta_\theta(0)$ is greater than 0 and less than 30. It is useful to note that the reciprocal of the total beta value $1/\beta$ equals the sum of the reciprocals of the poloidal and toroidal beta values. In one embodiment, approximately linear refers to values within 20% of linear. In an alternate embodiment, approximately linear refers to values within 3% of linear.

One of skill in the art will recognize that the poloidal magnetic fields 373 and toroidal magnetic fields 371 that satisfy the boundary condition of Equation 5 are very low. When the boundary conditions are satisfied, the plasma enters the minimum-energy state. Specifics of such enablement will be discussed hereafter. Generally, plasma in the minimum-energy state cannot change from the minimum-energy state unless energy is added to the plasma. As a result, instabilities due to pressure perturbations, wall effects, kinetic effects, inconsistencies in magnetic and electrical fields, and the like are mitigated as the plasma seeks the minimum-energy state. In the minimum-energy state, energy can be added to the plasma to increase the temperature while an electrical field drives current to change magnetic fields in such as way as to maintain the proper beta conditions.

Figure 13:
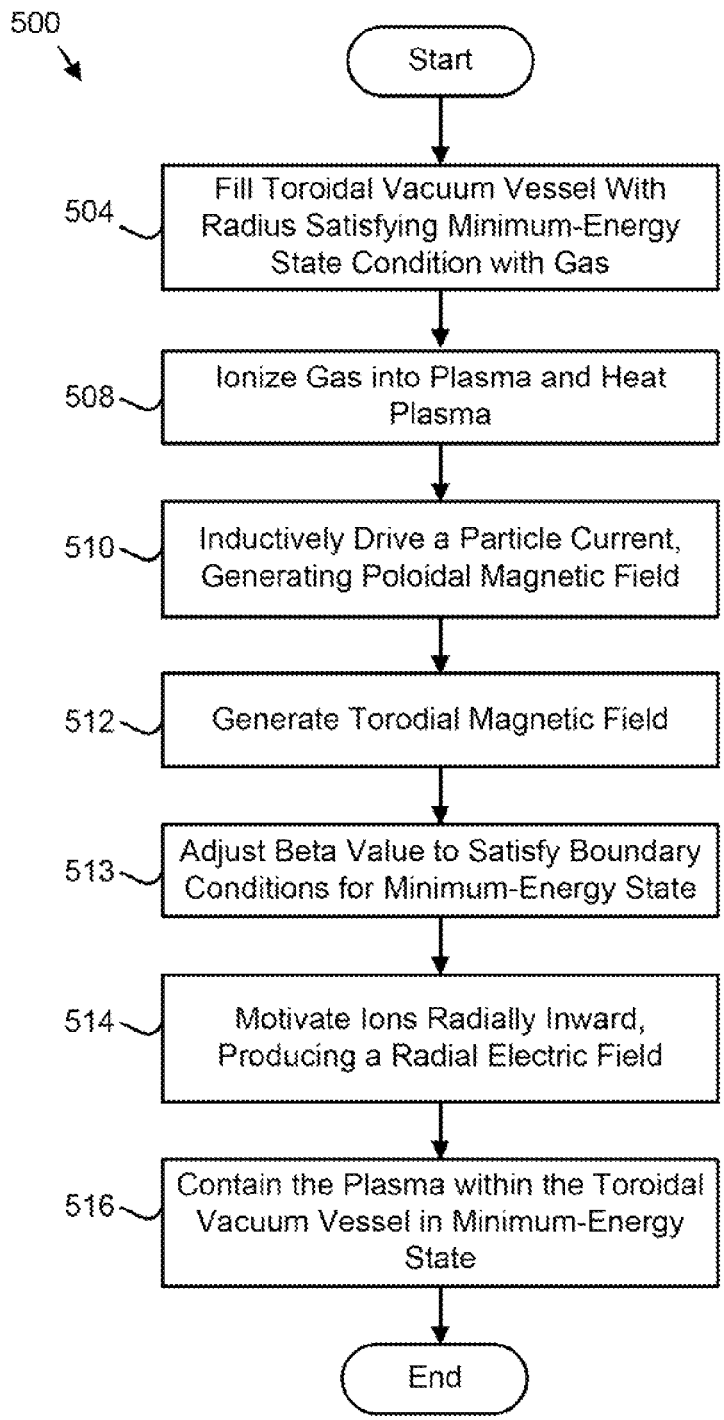
FIG. 13 is a schematic flow chart diagram showing one embodiment of a plasma containment method.

FIG. 13 is a schematic flow chart diagram showing one embodiment of a plasma containment method 500. The method 500 may heat a plasma in the containment apparatus 320 from an ambient temperature into that needed for the minimum-energy state equilibrium for an to ion-mode current. The description of the method 500 refers to elements of FIGS. 1-12, like numbers referring to like elements.

The method 500 starts, and the toroidal vacuum vessel 322 with a minor radius 212 selected to satisfy conditions for the minimum-energy state is filled 504 with the gas 391. The major radius 208 R and the minor radius 212 may be selected to enable an ion-mode particle current 332 in the minimum-energy state. If the minor radius 212 a is between 1 and 2 ion skin depths as calculated using the mass of an ion, then the containment apparatus 320 will operate in the ion mode after the plasma drops into the minimum-energy state. For example, for a deuterium as with a number density of $10^{19}/m^3$, the minor radius 212 is 16 centimeters (cm). Alternatively, for a deuterium gas with a number density of $10^{21}/m^3$, the minor radius 212 is 1.6 cm.

In one embodiment, the gas valve 397 is closed, the vacuum valve 395 is opened, and the vacuum pump 394 evacuates the toroidal vacuum vessel 322. After the toroidal vacuum vessel 322 reaches a specified purging pressure, the vacuum valve 395 may be closed. In one embodiment, the specified purging pressure is in the range of $10^{-7}$ torr to $10^{-12}$ torr. The evacuating of the toroidal vacuum vessel 322 substantially eliminates impure gases from the toroidal vacuum vessel 322.

The gas valve 397 may be opened and the desired fill gas 391 may flow into the toroidal vacuum vessel 322 until the gas 391 reaches an initial particle density a, after which the gas valve 397 is closed. The initial particle density n may be calculated using Equation 6, where m is the mass of the ion charge carrier, $\mu_0$ is the permeability of free space, e is the electron charge, a is the minor radius 212 of the toroidal vacuum vessel 322, and η is a constant in the range of 1 to 2. In a certain embodiment, η is 1.6.

$$n=(m\eta^2)/(a^2\mu_o e^2) \qquad \text{Equation 6}$$

For gas fills consisting of more than one ion species, the value of n lies between the extreme values for the individual ions and can be determined by solving the set of differential equations obtained by minimizing the total energy, as illustrated in the previously referred to application but modified to regard multiple ion species. While the fill gas density a of the described embodiment is small compared to standard tokamak containment systems, later compression during the minimum-energy state confinement will cause the plasma number density to be considerably higher than the initial fill gas density n.

The ionizing device 341 ionizes and heats 508 the gas 391 into a hot plasma comprising ions 410 and electrons 412. In one embodiment, the ionizing device is one or more microwave generators 318. The microwave generators 318 may generate energy in the range of 0.5 to 2 kilowatt (kW).

In one embodiment, the transformer 326 generates the axial or toroidal electric field 321 that inductively drives 510 the particle current 332 within the toroidal vacuum vessel 322. The particle current 332 may initially be dominated by electron charge carriers. The conductivity of the particle current 332 is modified by the relationship for conductivity perpendicular to a magnetic field as expressed in Equations 7, 8, and 9, absent other forces, where $\sigma_o$ represents the free-space conductivity, $\upsilon_e$ is the electron collision frequency, and $\omega_{ce}$ is the electron cyclotron frequency.

$$\sigma=\sigma_o/(1+(\omega_{ce}/\upsilon_e)^2) \qquad \text{Equation 7}$$

$$\sigma_o=ne^2/m_e\upsilon_e \qquad \text{Equation 8}$$

$$\omega_{ce}=eB/m_e \qquad \text{Equation 9}$$

The particle current 332, acting against plasma resistance, adds heat to that produced within the plasma by the microwave. Assuming, that the motion of one species—electrons in one embodiment are substantially at rest, Equations 10 and 11 govern the plasma, where p is the scalar pressure and j is the net current comprising the induced toroidal particle current 332 self-generated toroidal current and self-generated poloidal current. e is the positive magnitude of the electron charge, $\mu_o$ is the permeability of free space, $\epsilon_o$ is the capacitivity of free space, e is the radial unit vector, E is the total electric field (axial and radial) and in is the mass of the current carrying charged particle. Cylindrical symmetry is assumed, which approximately holds for high-aspect-ratio toroid.

$$\nabla\times B=\mu_o j \qquad \text{Equation 10}$$

$$enE+j\times B-emnu^2/r=\nabla p \qquad \text{Equation 11}$$

$$\nabla\cdot E=e(n-n_o) \qquad \text{Equation 12}$$

As the particle current 332 j increases by being driven 510 by the axial electric field 321 The toroidal particle current 332 generates the poloidal magnetic field 373 and the total field B begins to deviate from purely toroidal to helical. At the same time a poloidal electric field generating a poloidal current that reduces the toroidal magnetic field 371 produced by the poloidal coils 414. This poloidal electric field may result from the internal processes of the plasma dropping into the minimum-total-energy state as described elsewhere.

The field coils 414 generate 512 the toroidal magnetic field 371 within the toroidal vacuum vessel 322. In one embodiment, the toroidal current is applied to the field coils 414 by the toroidal power supply 370. The toroidal beta value $\beta_\phi$ is adjusted by modifying the toroidal magnetic field 371 generated by the field coils 414 to satisfy a boundary condition at the wall of toroidal vacuum vessel 322 such that the poloidal beta value $\beta_\theta$ for the poloidal magnetic field 373 and the toroidal beta value $\beta_\phi$ for the toroidal magnetic field 371 satisfy the toroidal/poloidal minimum-energy state relationship of Equation 5.

When the values of $1/\beta_\theta$ and $1/\beta_\phi$ are adjusted to values that satisfy Equation 5, the plasma satisfies the minimum-energy state equilibrium. The plasma may enter the minimum-energy state equilibrium in response to a perturbation of the plasma.

The electrons and ions within the toroidal vacuum vessel 322 may have an electron collision frequency $\upsilon_e$ that is small compared with the electron cyclotron frequency $\omega_{ce}$. The ratio $\omega_{ce}/\upsilon_e$ is referred to as the Spitzer Factor in honor of Lyman Spitzer who observed that if an electric field E, perpendicular to a uniform magnetic field B, is initially imposed on a fully ionized plasma having the electron cyclotron frequency $\omega_{ec}$ large compared with the electron collision frequency $\nu_e$, then, for a time comparable to the reciprocal of the ion cyclotron frequency the contribution of the ions to a current density parallel to E far outweighs that of the electrons. [L. Spitzer, 38] Equation 13 calculates the Spitzer Factor.

$$\omega_{ce}/\upsilon_e = eB/m_e\upsilon_e \qquad \text{Equation 13}$$

Where the Spitzer Factor is large, such as when conditions for the minimum-energy state are satisfied, then for a time comparable to the reciprocal of the ion cyclotron frequency, the contribution of ions 410 to the particle current 332 far outweighs that of the electrons 412 from the gas 391. In addition, the contribution of the ions 410 will continue to dominate the particle current 332 as long as a and $\Lambda$ satisfy the scale length condition for ions 410.

As a result the equilibrium particle current 332 is effectively the ion current. The poloidal magnetic field 373 diamagnetically reduces the toroidal magnetic field 371 near the toroidal axis 213. Diamagnetism is one indication of the minimum-energy state.

As the plasma enters the minimum-energy state, the ions are motivated 314 radially inward toward the toroidal axis 213 to within an inner boundary to conserve energy, separating the ions from the electrons. The separation of the ions and electrons produces a radial electric field within the plasma between the ions which are radially inward toward the toroidal axis 213 and the electrons which are radially outward from the toroidal axis 213. Because the ions carry the particle current 332, the radial magnetic force on the ions 410 is large and is balanced out by the sum of thermal forces seeking to expand the plasma and radial electric field which are now in the same direction. As a result, ion conductivity has a free space value instead of being reduced by the presence of the toroidal magnetic field 371 and the poloidal magnetic field 373.

As the particle current 332 increases, the poloidal magnetic field 373 also increases and the toroidal magnetic field 371 decreases. The net interaction of the magnetic fields on the two components of the current velocity further motivates 514 the ions radially inward toward the toroidal axis 213 and within the inner boundary, further separating the ions radially inward from the electrons. As used herein, motivate refers to applying a force that moves, deflects, and/or accelerates a particle. In one embodiment, the poloidal magnetic field 373 produces a force on the ions due to toroidally oriented particle current 332 that is directed toward the radial axis 213, motivating 514 the particles radially inward. The net toroidal magnetic field 373 produces a force on the ions due to poloidally oriented particle current 332, that force also being directed toward the radial axis 213, motivating 514 the particles radially inward. The separation of the ions and the electrons produces a radial electric field within the plasma between the radially inward ions and the radially outwards electrons. The radial electric field is radially directed toward the toroidal axis 213 of the toroidal vacuum vessel 213. The radial electric field attracts the electrons to the magnetically-confined ions, confining the electrons within the outer boundary.

The radial electric field, the poloidal magnetic field 373 and the toroidal magnetic field 371 contain 516 the plasma within the toroidal vacuum vessel in the minimum-energy state within an outer boundary of between 1 and 2 first particle skin depths and the method 500 ends. In one embodiment, the containment 516 of the electrons within the outer boundary is primarily dependent on the skin depth $\Lambda_e$ defined in Equation 1, with the outer boundary being determined by the mass of the ions and the particle density. The plasma may be contained in the minimum-energy state even if neutral particles are present with the ions and the electrons, as long as the neutral particles have an appropriate density and collision frequencies.

Driving ion current resulting in ion-mode containment of the plasma is illustrated by examining simplified equations of motion for electrons and ions in the plasma. In weakly ionized plasmas electron-neutral and ion-neutral collisions must be considered. Neglecting radially-dependent factors, using rectangular coordinates, assuming that a uniform, constant axial electric field 408 is applied to t=0 and that $u_e(0)=u_i(0)=0$. The equations of motion are expressed by Equations 14 and 15, $C_i$ and $C_e$ are collision terms for the two specified and $u_i$ and $u_e$ are ion and electron fluid-velocities, respectively.

$$m_i du_i/dt = eE - C_i(u_i, u_e) \qquad \text{Equation 14}$$

$$m_e du_e/dt = -eE - C_e(u_e, u_i) \qquad \text{Equation 15}$$

Because magnetic forces on the ions are balanced by thermal and electrostatic forces, the magnetic field does not affect the ion collision term (or ion conductivity), hence Equation 16 expresses the collisions for ions $C_i$, where $\nu_{ie}$ and $\nu_{in}$ are the ion-electron and ion-neutral collision frequencies respectively.

$$C_i = m_i\nu_{ie}(u_i - u_e) + m_i\nu_{in}u_i \qquad \text{Equation 16}$$

The electron collision term $C_e$ is expressed by Equation 27, where $\sigma_e$ is the conductivity of the electron fluid and $j_e$ is its current density.

$$C_e = j_e e/\sigma_e \qquad \text{Equation 17}$$

If the magnetic field effect on electron conductivity were not significant then one would use $j_e = ne(u_e - u_i)$ resulting in an electron collision term similar to that of the ions in Equation 15. However because the magnetic influence on electron motion is significant one must use $j_e = neu_e$ and Equation 18.

$$C_e = m_e\nu_e(1 + \omega_e^2/\nu_e^2)u_e \qquad \text{Equation 18}$$

The electron velocity is used in Equation 16 rather than the relative electron-ion velocity because the magnetic-field effect on electrons under action of an external electric field requires using the electron velocity with respect to the magnetic field, i.e., with respect to the laboratory system.

In one prophetic example, the magnetic field B used in the Spitzer factor in Equation 17, $\omega_{ce}/\nu_e$ 32 $eB/m_e\nu_e$, is externally imposed and little changed by internal plasma currents. In a second example, the magnetic field B is primarily derived from internal plasma currents. Solving Equation 14 using external B and $(\omega_{ce}/\nu_{ei})^2 \gg 1$ is straightforward. This would apply to toroidal magnetic fields and poloidal currents which are here over-simplified by using rectangular coordinates. This solution is expressed in Equation 19, $\tau_e = (m_e\nu_{ei}/eB)^2/\nu_{ei} = \nu_{ei}/\omega_{ce}^2$.

$$u_e = \frac{-eE\tau_e}{m_e}(1 - e^{-t/\tau_e}) \qquad \text{Equation 19}$$

Solving Equation 14 using Equation 16 is not difficult. The solution is particularly simple when the ion-electron collision term, obtained from $m_i v_{ie} = m_e v_{ei}$, is small with respect to the ion-neutral collision term. In this event the solution to Equation 13 is expressed by Equation 20, where $\tau_i = v_{in}^{-1}$.

$$u_i = \frac{eE\tau_i}{m_i}(1 - e^{-t/\tau_i}) \qquad \text{Equation 20}$$

The steady-state ration of the velocities, and thus of the corresponding current densities of the ion current and the electron current, is expressed by Equation 21.

$$\frac{u_i}{u_e} = -\frac{m_e v_{ei}}{m_i v_{in}} \cdot \left(\frac{\omega_{ce}}{v_{in}}\right)^2 \qquad \text{Equation 21}$$

Because the ratio of mass multiplied by collision frequencies is small, if the Spitzer factor is large then ion current dominates. This is true for Venus ionosphere as well as for the containment apparatus 320 to be considered forthwith.

In the second prophetic example, toroidal currents creating poloidal magnetic fields are over simplified, again using rectangular coordinates. If the magnetic field B is produced by plasma current itself then one must obtain B from $u_i$ and $u_e$, substituting this in $\omega_{ce}/v_{ei} = eB/m_e v_{ei}$ which gives $C_e$ in Equation 15 from which the differential equations, Equations 13 and 14, can be solved. To simplify this example, assume that the current density is uniform and overestimate the magnitude of the magnetic field to be $\mu_o I/2\pi R$. Then use $I = ne(u_e - u_i)\pi R^2$, Equations 1 and 2, and $m_e v_{ei} = m_i v_{ie}$ to obtain Equation 22.

$$C_e = m_i^2 \eta^4 u_e (u_e - u_i)^2 / (4 m_e v_{ei} R^2). \qquad \text{Equation 22}$$

The plasma has the proper values of T, α, and β for the toridal vacuum vessel 322 to contain 516 the plasma in the minimum-energy state as the final containment state. These values of T, α, and β, however, represent only boundary conditions (coupled with input initial conditions) whereas the minimum-energy state specified radial profiles of all variables. For example, T is the average temperature, the toroidal beta $\beta_o$ is determined by the average number density $n_o$, average temperature T, and toroidal current I; the poloidal beta $\square_\theta$ is determined by $n_o$, T, and the boundary value of the toroidal magnetic field 371.

The method 500 contains plasma with an ion-mode particle current 332. As energy is added to the plasma, temperatures and density values can increase while the minimum-energy state can be maintained by changing magnetic field values thus preventing perturbations from disrupting containment. As a result, the plasma is contained for significant durations in with a containment apparatus 320 of a size that is practical for applications including particle generation for scanning objects. The low magnetic fields employed further enhance the utility of the containment apparatus 320.

Figure 14:
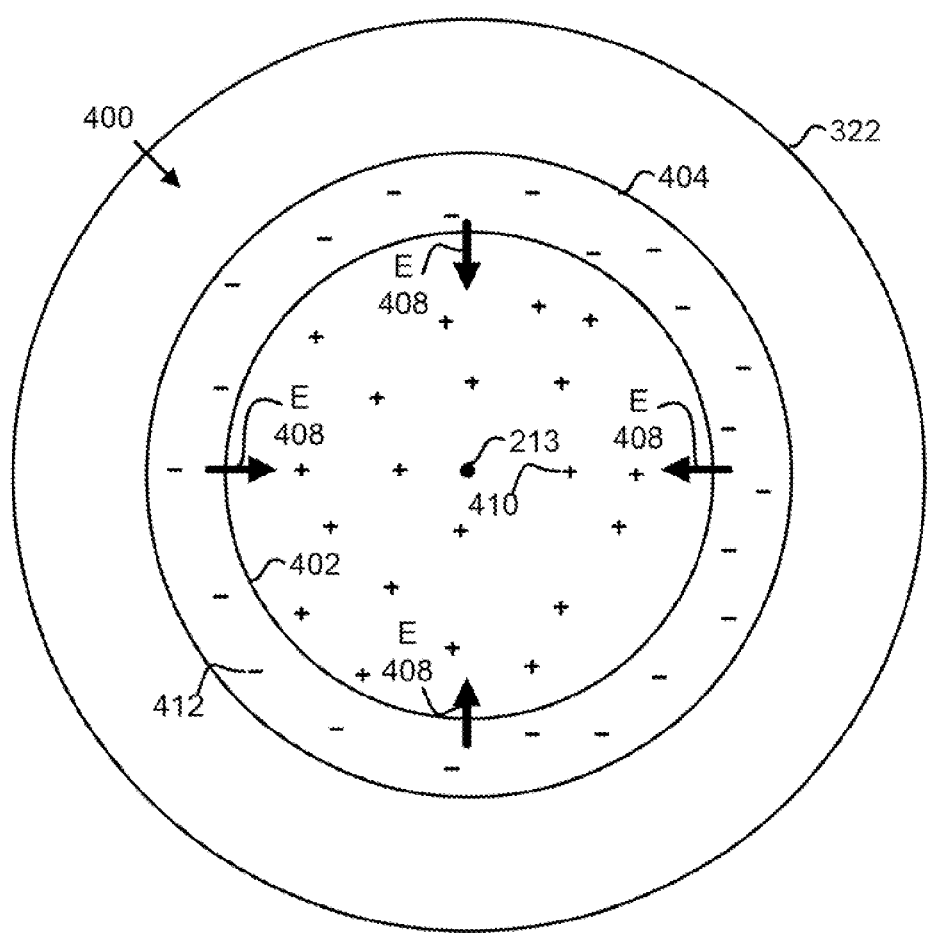
FIG. 14 is a schematic poloidal cross section cutaway drawing illustrating one embodiment of ionized particles.

FIG. 14 is a schematic cutaway drawing illustrating one embodiment of ionized particles. A cross-section of the toroidal vacuum vessel 322 is shown. The description of the ionized particles refers to elements of FIGS. 1-11, like numbers referring to like elements.

The separation of the ions 410 and the electrons 412 produces the radial electric field 408 within the plasma 400 between the radially inward ions 410 and the radially outwards electrons 412. The radial electric field 408 is oriented along the toroidal axis 213 of the toroidal vacuum vessel 322. The radial electric field 408 motivates the electrons 412 toward the ions 410, thus confining the electrons 412 within the outer boundary 404. The poloidal magnetic field 373 and toroidal magnetic field 371 further confine the ions 410. The electrons 412 have come essentially to rest hence there is little influence of the magnetic field upon them.

Figure 15A:
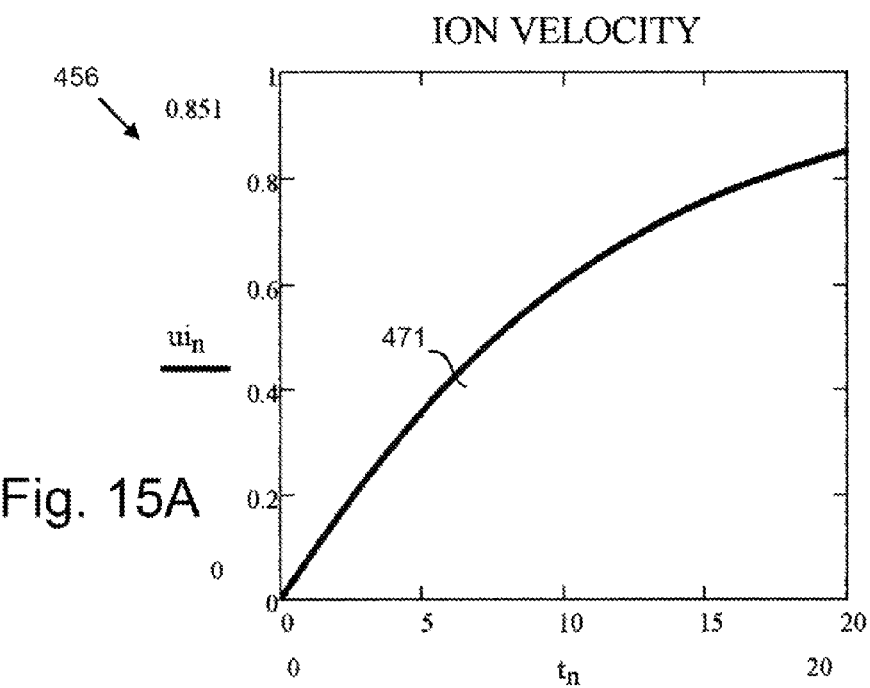
FIG. 15A-B shows graphs of ion startup velocities and electron startup velocities in the plasma.
Figure 15B:
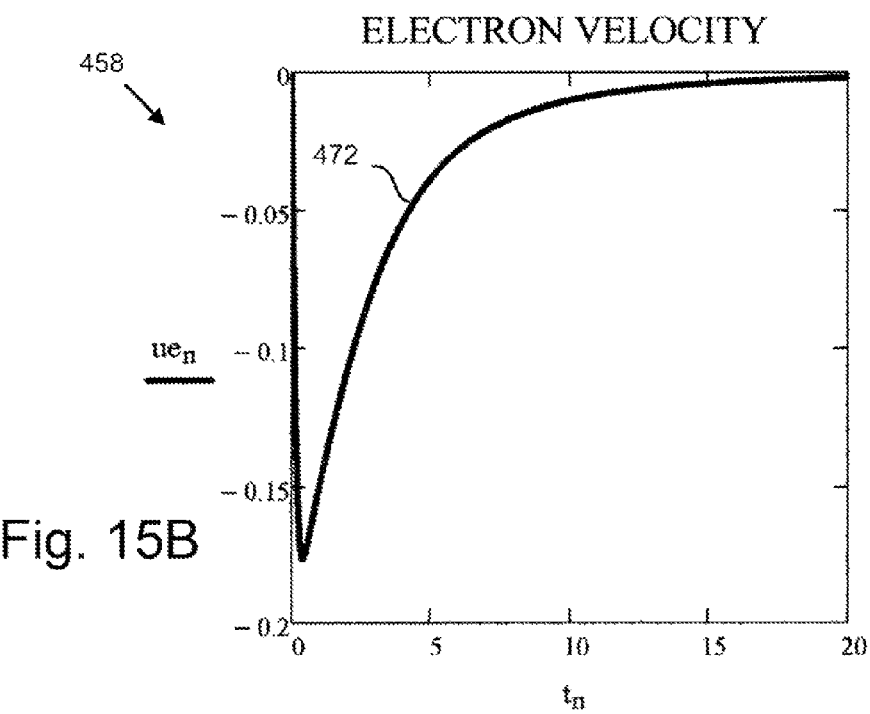

FIG. 15A-B shows graphs 456, 458 of ion velocities 471 and electron velocities 472 in the plasma 400. The velocities 471, 472 are calculated from Equations 14 and 16 using the collision terms of Equations 16 and 18 and assuming an ion mass of ten electron masses, and are not experimental values. The ion velocity graph 456 shows the velocities 471 of the ions 410 over time. The electron velocity graph 458 shows the velocities 472 of the electrons 412. The description of the graphs 456, 458 refers to elements of FIGS. 1-12, like numbers referring to like elements.

The electron velocity graph 458 shows that electron velocity 472 is initially large as electrons carry most of the particle current 322. In contrast, the ion velocity graph 456 shows that ion velocity 471 is low. However, as the minimum-energy state is approached the velocity 472 of the electrons 412 decreases while the velocity 471 of the ions 410 continues to increase, indicating that ions comprise most of the particle current 322 as equilibrium is approached.

FIG. 16A-B shows graphs of calculated radial electrostatic, magnetic, and thermal forces on electrons 412 and ions 410 in the plasma 400. The values are calculated using equations 14, 15, and 22 and are not experimental values. FIG. 16A shows radial profiles of electrostatic forces 432, magnetic forces 431, and thermal forces 433 on electrons 412 in a Z-pinch ion-mode equilibrium. FIG. 16B shows radial profiles of electrostatic 432, magnetic 431, and thermal forces on ions 410 in a Z-pinch equilibrium. The magnitudes of electrostatic forces 432 and thermal forces 433 are approximately equal. Magnetic forces 431 on ions 410 balance the sum of electric 432 and thermal forces 433 but are negligible on electrons 412 that are essentially at rest in the ion mode.

Figure 17:
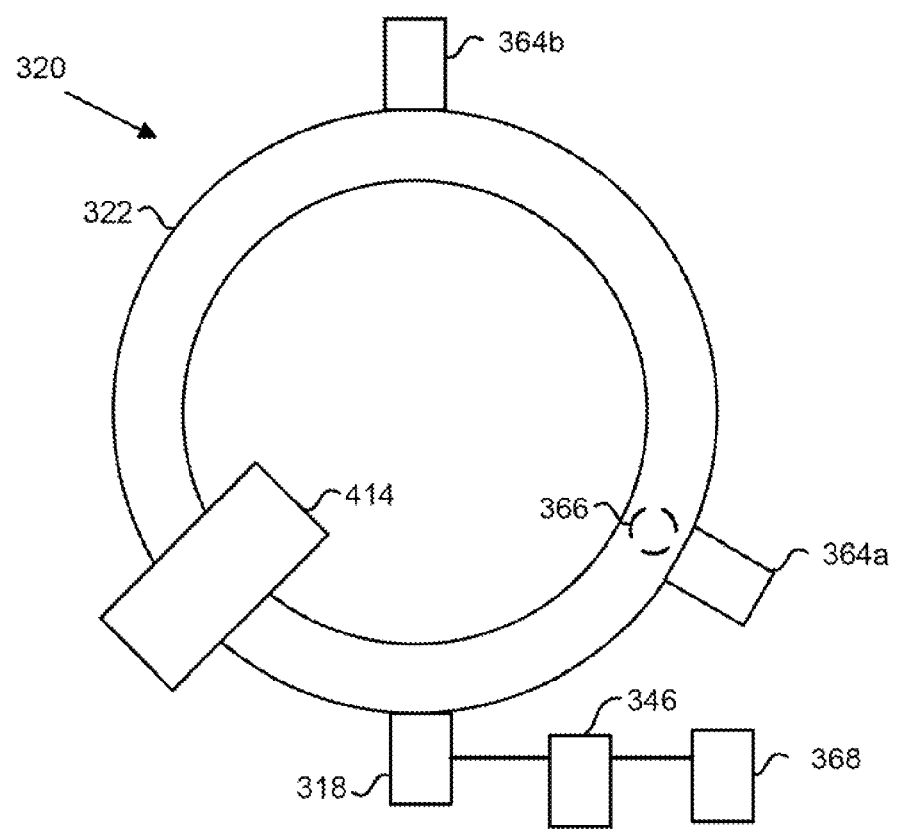
FIG. 17 is a top-view schematic drawing illustrating one embodiment of a containment apparatus.

FIG. 17 is a top-view schematic drawing illustrating one embodiment of a containment apparatus 320. The containment apparatus 320 illustrates the configuration of an experimental device used at Utah State University. The description of the containment apparatus 320 refers to elements of FIGS. 1-16B, like numbers referring to like elements. The containment apparatus 320 includes one or more Langmuir probes 364 and a Hall probe 366. In the depicted embodiment, the Langmuir proves 365 are positioned at 45° and 180°. The Hall probe 366 is positioned at 45°.

The toroidal vacuum vessel 322 has a major radius 208 of 22 cm and a minor radius 212 of 5 cm. This minor radius 212 is suitable for the generation of an electron-mode plasma but not an ion-mode plasma. Measurements taken on the containment apparatus appear to confirm the minimum-energy state.

Twenty-four field coils 414 are capable of generating a toroidal magnetic field 371 of approximately 5 kilo Gauss (kG) for 4 ms and a sustained toroidal magnetic field 371 of approximately 200 Gauss for several seconds. A high voltage capacitor 368 charged to 4800 Volts (V) drives a microwave generator 318 delivering microwaves to the toroidal vacuum vessel 322 at the microwave port located at 0°, where positions around the toroidal vacuum vessel 322 are measured in degrees. The microwave generator 318 produces 2.45 Gigahertz (GHz) microwaves that enter the toroidal vacuum vessel 322 through a WR 430 waveguide and a Teflon vacuum flange (not shown). A three stub tuner 346 tunes the impedance of the microwave generator 318. Microwave power is approximately 1 kW. In the depicted embodiment, the duration of the plasma is limited by the charge of the capacitor 369. As used herein, approximately refers to plus or minus 20%.

Hydrogen gas 391 fills the toroidal vacuum vessel 322 with a pressure of approximately $2 \times 10^{-2}$ torr. The microwave generator 318 fires and provides microwave power once the filament has reached emission temperature. Microwaves are directed into the toroidal vacuum vessel 322, producing plasma 400 that is approximately 1% ionized. The high voltage on the capacitor 369 begins to slowly drop as the microwave generator 318 draws current. Microwaves are produced until a lower threshold voltage is reached or the high voltage is shut off at which time the microwave generator 318 no longer provides microwave energy to produce plasma. This time period to the end of plasma production is approximately 500 ms; this each plasma pulse lasts for about 0.5 sec.

The plasma forms inside the toroidal vacuum vessel 322 near the microwave port which is the entrance position of the microwaves produced by the generator 318. This plasma then diffuses around the toroidal vacuum vessel 322. When there is no toroidal magnetic field 371, plasma diffusion around the toroidal vacuum vessel 322 is restricted due to collisions and losses against the wall of the toroidal vacuum vessel 322. As a result, no measurable plasma density is observed at the Langmuir prove 365*b* located 180° from the microwave generator 318. The depicted containment apparatus 320 has measurement ports only at locations 45° and 180°.

At finite values of the toroidal magnetic field 371 the density becomes more uniform with toroidal angle and is measurable at the Langmuir probe 365*b* located at 180°. The toroidal magnetic field 371 confines the plasma 400 radially and allows diffusion along the magnetic field lines in the toroidal direction.

Langmuir probes 365 measure density n, and electron temperature $T_e$. Values of the internal poloidal magnetic field 373 and toroidal magnetic field 371 are measured using the Hall probe 366 that is provided with two heads. The density n is determined using the ion saturation current to a Langmuir probe 365 and electron temperature $T_e$ is measured using a Langmuir triple probe 365.

Figure 18A:
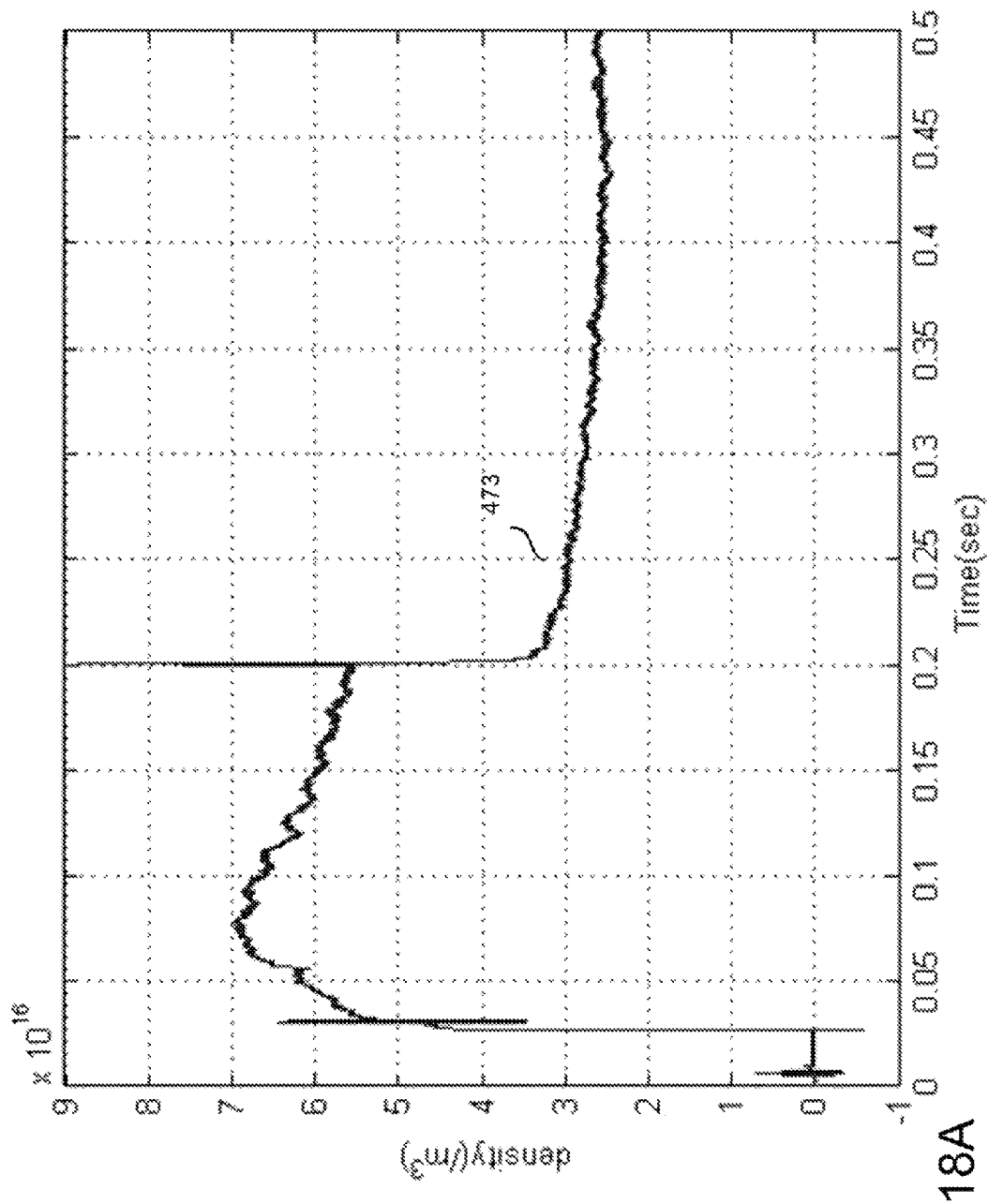
FIGS. 18A-B are graphs showing measurements of density and electron temperature for the containment apparatus of FIG. 17.
Figure 18B:
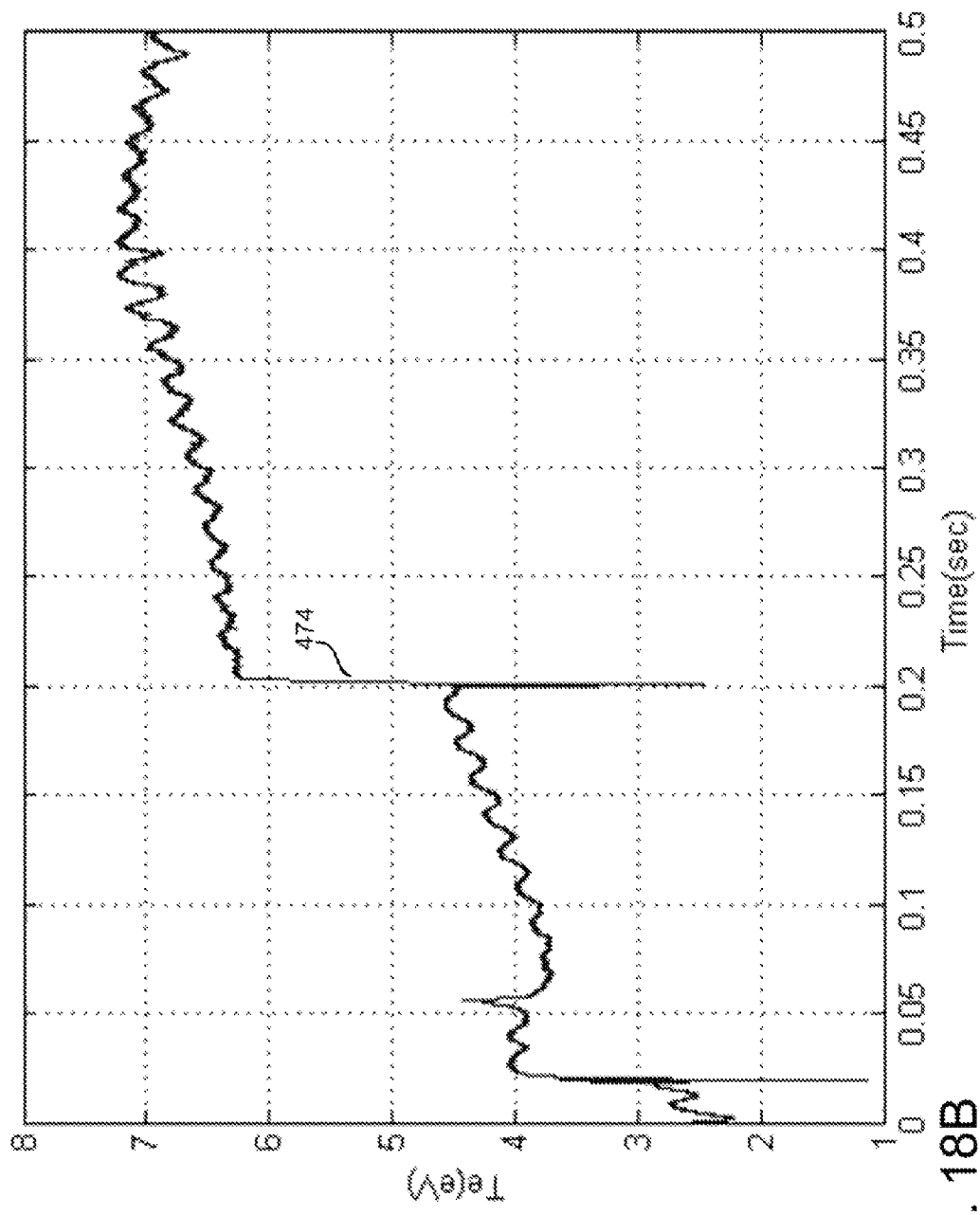

FIGS. 18A-B are graphs showing measurements of density n(t) 473 and electron temperature $T_e(t)$ 474 at 45° for the containment apparatus 320 of FIG. 17. The toroidal magnetic field 371 is switched on at 0.2 s. The toroidal magnetic field 371 confines the plasma 400 radially and aids in the plasma's diffusion toroidally along the field lines of the toroidal magnetic field 371. At sufficient strength, the toroidal magnetic field 371 affects the plasma production. Hence n 473 and $T_e$ 474 change as the toroidal magnetic field 371 is applied. A 60 Hz noise is seen because the microwave generator 318 filament is heated with a 60 Hz AC supply voltage. It is important to note that, with time, the density 473 slowly drops at 45° while the electron temperature 474 slowly increases.

FIGS. 19A-B are graphs showing radial density profile measurements of plasma 400 along a horizontally-oriented minor radius 212 and similar temperature profiles at 45° with a toroidal magnetic field 371 of 0 G, 481, 17 G 482, 22 G 483, 27 G 484, 32 G, 485, 34 G 486, and 45 G 487 for the containment apparatus 320 of FIG. 17. The 0 value of radial density measurements is at the limiter/vessel wall. Radial numbers are in mm, the approximate poloidal center being at 35 mm. Although the toroidal vacuum vessel 322 has 50-mm minor radius 212 there is a limiter restricting the plasma to a radius of approximately 35 mm. Note that n and $T_e$ are relatively uniform radially at $B_\phi = 22$ G.

FIG. 19A shows electron number density profile measurements of electrons per cubic meter ($m^{-3}$) as a function of radial position for the toroidal magnetic fields 371 of 0 Gauss (G) 481, 17 G 482, 22 G 483, 27 G 484, 32 G, 485, 34 G 486, and 45 G 487. The measurements were taken at 45°. FIG. 19B shows electron temperature measurements in electron volts (eV) as a function of radial position in the plasma for the external imposed toroidal magnetic fields 371 of 0 G 481, 17 G 482, 22 G 483, 27 G 484, 32 G, 485, 34 G 486, and 45 G 487. The 0 value is at the edge of the plasma nearest the outer wall of the toroidal vacuum vessel 322. The center of the minor diameter 212 is at ~35 mm. The measurements were taken at 45°.

Figure 20:
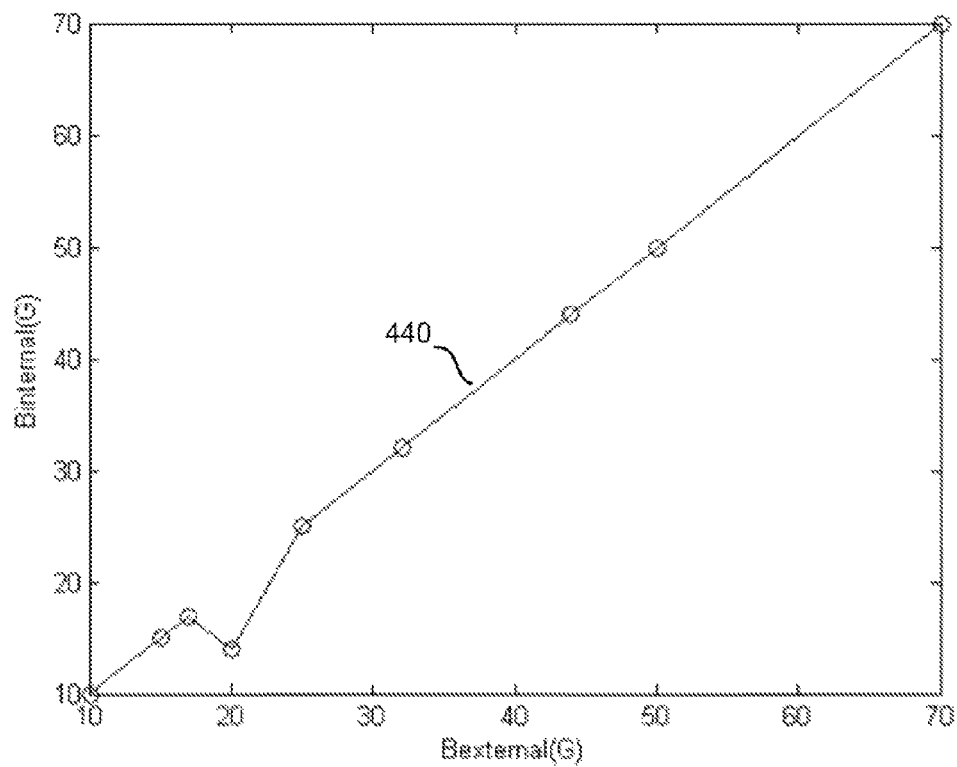
FIG. 20 is a graph plotting internal and external magnetic fields for a containment apparatus.

FIG. 20 is a graph plotting internal magnetic fields 440 against external magnetic fields 440 for the containment apparatus 320 of FIG. 17. The graph plot shows magnetic field strength 440 in tests to observe whether or not a portion of the microwave-produced plasma was attaining diamagnetism as the minimum-energy state beta and minor radius 212 conditions were met. From values in FIGS. 19A and 19B it is clear that the beta values were within reach of the containment apparatus 320 of FIG. 17. For electron mode, the value of n to satisfy the minor radius 212 condition is $5.9 \times 10^{16}/m^3$. Using $n = 5.9 \times 10^{16}$ and $T = 5$ eV, a value of the toroidal magnetic field 371 of 16 G would approximately produce the minimum-energy state presuming that these values are attained near the 45° probes.

$B_\phi$(external) is the toroidal magnetic field 371 produced by the 24 field coils 414 arranged uniformly around the toroidal vacuum vessel 322. The values of $B_\phi$(external) are determined using the internal Hall probe 366 with no plasma present. The value of $B_\phi$(internal) is determined using the same Hall probe 366 but with plasma present. The consistency of these measurements is indicated by the fact that both internal and external $B_\phi$ values are the same for almost all applied (external) magnetic-field magnitudes as indicated in FIG. 20. The exceptions are at values of $B_\phi$ near 20 G—very close to the 16 G figure calculated using n and $T_e$ values measured at 45°.

Diamagnetism with $B_\phi$(external)=20 G is evident; there is a 30% reduction fo the field. The reduction appears at radial values near 4 mm from the outer vessel limiter/wall. The only reasonable explanation for this field reduction is diamagnetic currents within the plasma. The growth factor of the instability leading to the diamagnetic state from calculations for the conditions in our system described later, indicates that within $10^{-6}$ s after achieving the necessary conditions for the minimum-energy state, the new minimum-energy state should be fully developed. Through careful arrangement of the magnetic field and plasma density and temperature in our device we are able to achieve the desired eta and density parameters that our theory predicts are necessary for the minimum energy state to occur. The fact that it does occur at plasma density, temperature and beta values near those calculated for the theory strongly suggests the existence of the minimum-energy state. Additional experiments are needed with new devices to further confirm and explain the observations.

Figure 21:
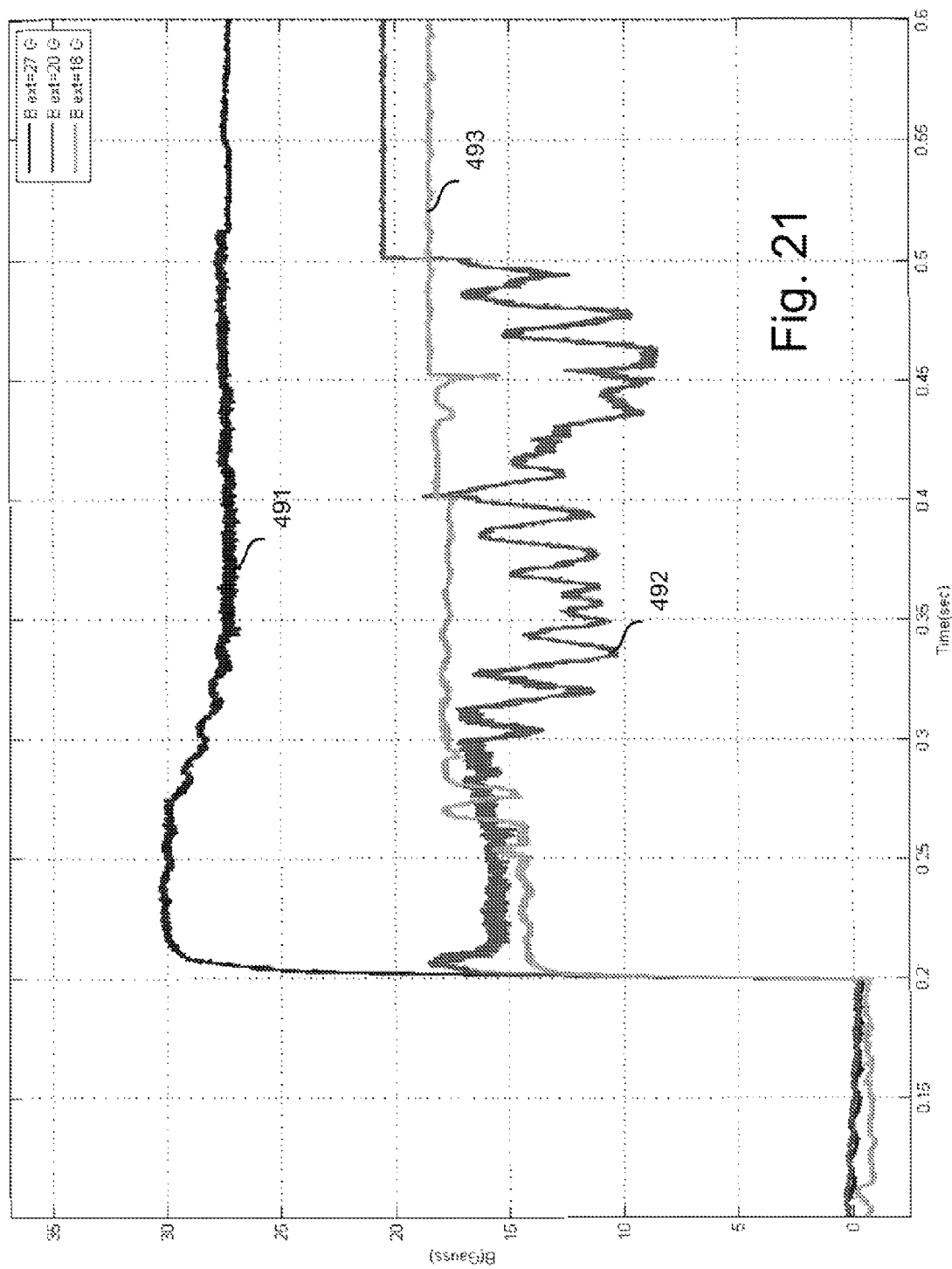
FIG. 21 shows three plots of an internal toroidal magnetic field as a function of time during individual pulses having different external toroidal magnetic fields.

FIG. 21 shows three plots 491, 492, 493 of the internal toroidal magnetic field $B_\phi$(internal) 371 as a function of time during the individual pulses for the containment apparatus 320 of FIG. 17. Toroidal magnetic fields 371 of 27 G 491, 20 G 492, and 18 G 493 are plotted. After the plasma is formed the toroidal magnetic field $B_\phi$(external) 371 comes on at 0.2 s. The plasma takes approximately 0.1 s to settle to the new n and $T_e$ conditions resulting from the imposed external toroidal magnetic field 371. These changes resulting from the imposition of $B_\phi$(external) are in radial and angular variations of n and $T_e$.

Two of the plots, at $B_\phi$(external) values of 18 G 493 and 27 G 491, indicate that the internal and external values of $B_\phi$ are the same for the rest of the pulse. This is confirmed by the fact the values of the toroidal magnetic field $B_\phi$(external) 371 at 18 G 493 and 27 G 491 do not change after the microwave generator 318 turns off and plasma disappears at approximately 0.5 s. After plasma is no linger produced the Hall prove 366 would measure the external toroidal magnetic field 371. In other words, from 0.3 s to 0.5 s with plasma, and from 0.5 s to 0.6 s without plasma, there is no significant change in the field for $B_\phi$(external)=18 G 493 and 27 G 491. This behavior is typical for all values of $B_\phi$(external) except those near 20 G 492.

On the other hand, with toroidal magnetic field $B_\phi$(external) 371=20 G 492 the internal field drops to ~14 G at times 0.3 s to 0.5 s but resumes the external field value when the plasma disappears from 0.5 s to 0.6 s. There is considerable 60 Hz noise during the diamagnetic portion of this pulse as would be expected because of the critical R dependence on n and the critical beta dependence on n and $T_e$ and inasmuch as n(t) and $T_e$(t) show significant 60 Hz noise signals as described and explained earlier.

The foregoing describes experimental observations of reduction in the magnetic energy of the plasma. The fact that this occurs at plasma density, temperature, and beta conditions and machine minor radius 212 calculated by the theory suggests that the plasma achieved the minimum-energy state predicted by the theory. Additional experimentation using new devices is planned to further examine the state.

There are many causes of plasma diamagnetism. A study continues with the intent of determining whether or not the present observations could be explained any other way than that the plasma dropping into the minimum-total-energy state with its inherent diamagnetism. Preliminary considerations of other explanations have not yielded any convincing alternatives. For example, diamagnetism resulting from gradients of n fails by predicting field-reduction magnitudes a factor of 100 too small and by the mechanisms inability to explain the limited magnetic range for the effect. This is not to say that a viable alternative explanation will not be forthcoming, however such an alternative has not yet been found.

Diamagnetism and magnetic flux rope formation in the ionosphere of Venus was observed by instruments aboard the Pioneer Venus Orbiter for a decade starting in 1978. The planet has little or no intrinsic magnetic field. The magnetic field is that contributed by the sum with a typical value of B being 90 nT. In addition, the flux ropes form in the ionosphere which is a very low-density plasma without the complications of a containment wall.

Figure 22:
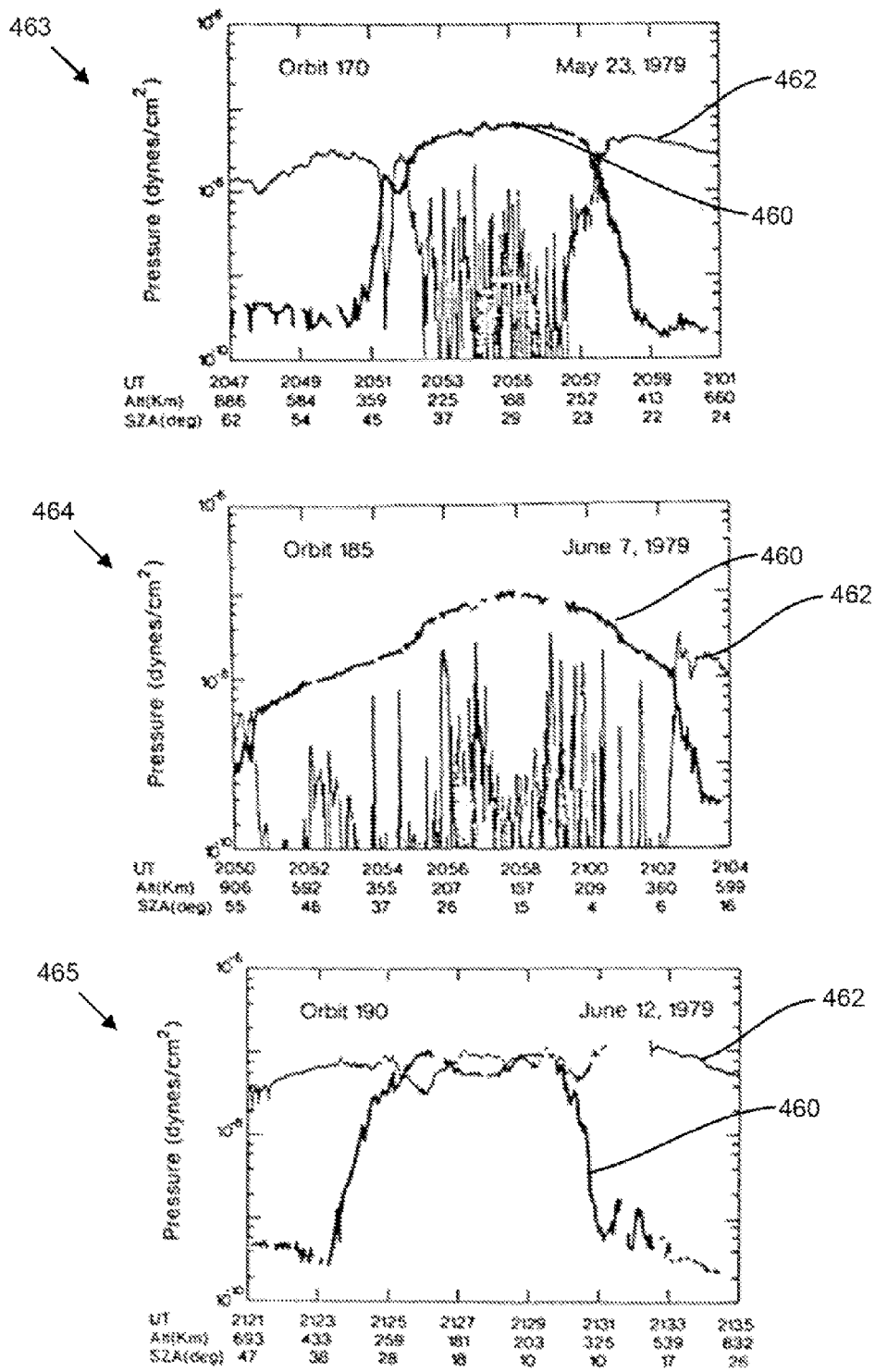
FIG. 22 shows graphs 464, 464, 465 of thermal pressure 460 and magnetic energy density 462 for three passes of the Pioneer Venus Orbiter.

FIG. 22 shows graphs 464, 464, 465 of thermal pressure 460 and magnetic field 462 for three passes of the Pioneer Venus Orbiter (Orbiter) from "Magnetic Flusx Ropes of Venus: Evidence for Restrictions on the Electromagnetic Theory of Collisionless Plasmas" by Boyd Farrell Edwards, 1982, page 6, hereinafter referred to as B. F. Edwards. The containment of plasma in the minimum-energy state is supported by the Orbiter observations. The $O^+$ ion dominates at ~250 km altitude with density ~$5\times10^{10}/m^3$ and temperature ~0.4 eV. The ropes are helical magnetic field structures. B. F. Edwards correlated flux-rope radii R at different altitudes with ion scale length $\Lambda$ as given in Equations 1 and 2 and obtained a least-squares fit of the value of $\eta$ of $1.44\pm0.10$. See B. F. Edwards, pp. 13-15. This compares well with the value of 1.6 obtained from the minimum-energy theory. It is evident from FIG. 22 that boundary values of plasma beta are near one. Approximately half the Orbiter passes into the ionosphere observed no effect; the rest did. When there was no effect the beta boundary conditions were not satisfied. When the conditions were satisfied the minimum-energy results were present.

To argue that the ions are the major current carries, the Spitzer conditions must be satisfied as well as the R condition using ion mass. In calculating the electron collision term, one must take into account electron-neutral as well as electron-ion collisions. Electron-ion collision frequencies have been obtained from $v_{ei}=(2.9\times10^{-11}\ (eV)^{3/2}m^3/s)n(kT)^{3/2}$.

Using the measured values of n and T, the electron-ion collision frequent $v_{ei}$ is determined to be 5.7/s. From Tables 4.5 and 4.6 in Schnunk and Nagy [2000], which are included herein by reference, electron-neutral and ion-neutral collision frequencies are found to be 1.1/s and 0.13/s respectively, consequently the electron-neutral collision frequency can be neglected. The ion electron collision term, obtained from $m_e v_{ei}=m_i v_{ie}$, is $2\times10^{-4}$/s and has been neglected with respect to the ion-neutral collision frequency. Thus the Spitzer factor, $eB/m_e v_{ei}$, is ~$3\times10^3$ supporting the case that ions would be the current carriers if the magnetic structures are minimum-energy structures. Because of the large value of the Spitzer factor, the final ratio of ion to electron currents would be approximately $9\times10^6$.

Matching minimum-energy theory to experimental observations for a single flux rope reveals the strength of the new theory upon which the present plasma containment device design is based.

Assume that the plasma density N changes little through the rope, as is confirmed by Orbiter measurements. The two components of the magnetic field $B_z$ and $B_\theta$ each are separated into two regions: inner and outer. The outer region is characterized by minimum-energy solutions to the plasma equations in cylindrical coordinates. These solutions minimize the total energy of the plasma in that region.

Solutions in the interior region cannot contribute to the minimization of the total energy but complete the profiles of the ropes at the expense of energy. It is clear however that the net energy remains a minimum.

In the interior solutions to the fundamental equations in cylindrical coordinates without requiring minimization of total energy are used. These are Bessel functions $J_0$ and $J_1$ (which correspond to cosine and sine in rectangular coordinates). In the outer region use Modified Bessel functions $K_0$ and $K_1$ (which correspond to exponentials). The latter minimize the total energy. Require that corresponding solutions for $B_z$ and $B_\theta$ and their first derivatives match at the points where they join.

Figure 23A:
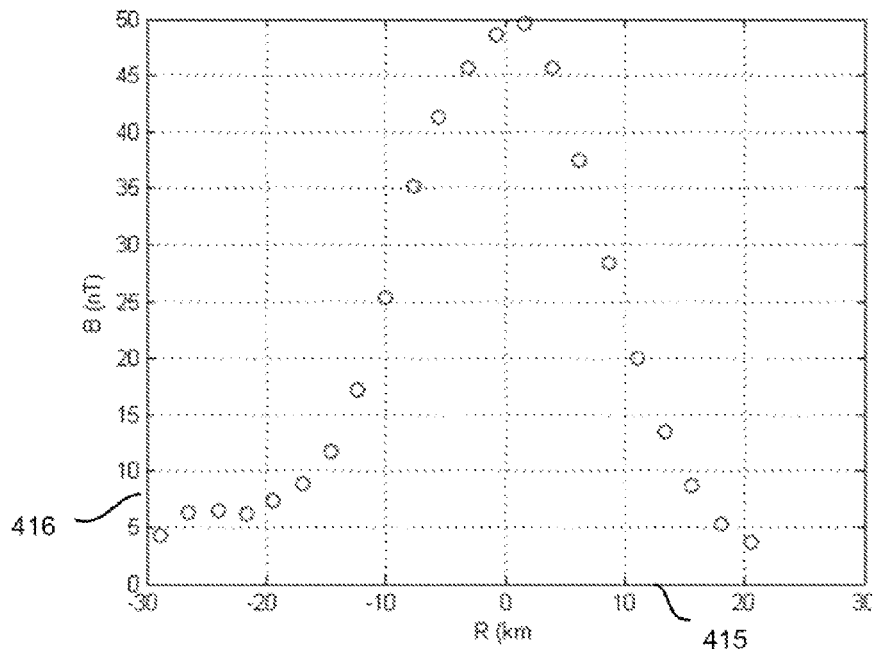
FIGS. 23A-B show graphs of measured values of the total magnetic field B(r) and the angle α(r) between the magnetic field vector with respect to the cylindrical flux-rope axis.
Figure 23B:
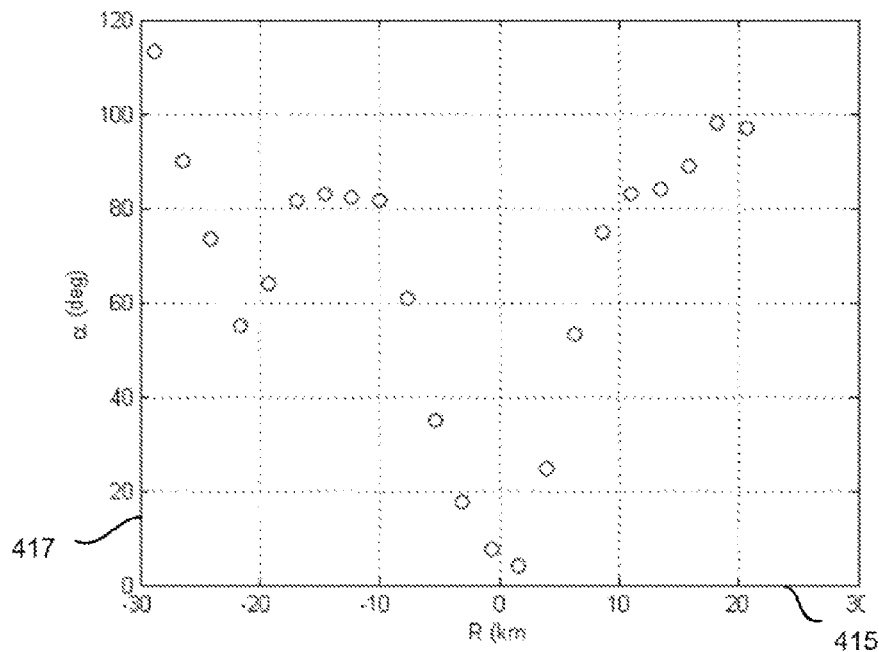

FIGS. 23A and 23B show measured values of the total magnetic filed B(r) and the angle $\alpha$(r) between the magnetic field vector with respect to a cylindrical flux-rope axis as generated from Pioneer Venus Orbiter data reported by C. T. Russell et al. in "Physics of Magnetic Flux Ropes" Geophysical Monograph 58, 1990, p. 418. FIG. 23A shows magnetic field magnitude measurements 416 in nT where the distance 415 from the rope axis is R in km. FIG. 23B shows the Orbiter measured angle $\alpha$ (in degrees) 415 between the magnetic field vector and the flux rope axis as a function of distance 415 R in km for the same Venus flux rope as in FIG. 23A.

Figure 24A:
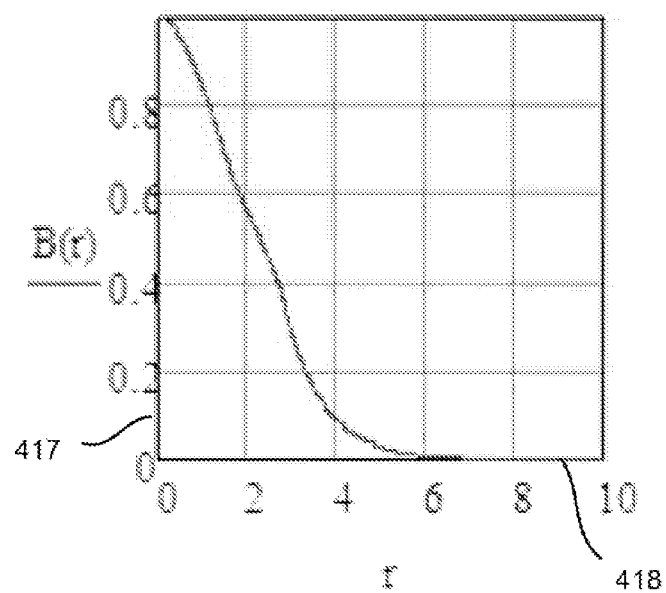
FIG. 24A shows a magnetic field magnitude from a model of a Venus flux rope.

FIG. 24A shows magnetic field magnitude 417 from a model of a Venus flux rope produced from the present theory above. The r value 418 is in units of $\Lambda$, already shown to correspond well with Venus flux ropes. Compare with FIG. 23A.

Figure 24B:
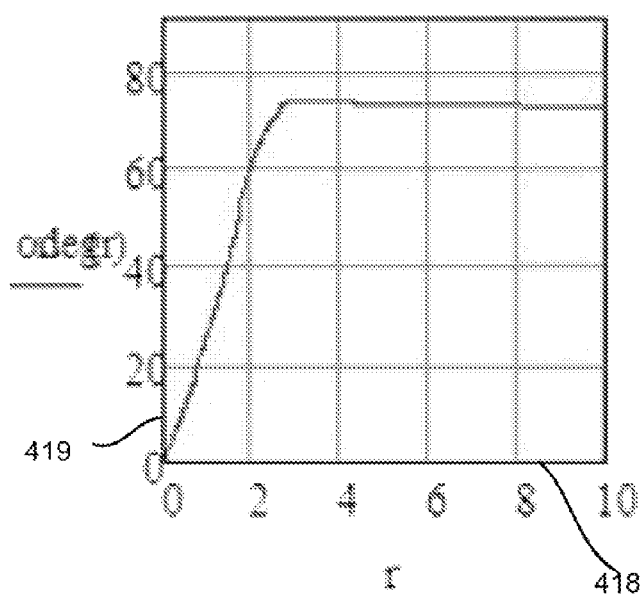
FIG. 24B shows an angle between a magnetic field vector and the flux rope axis from a model of a Venus flux rope.

FIG. 24B shows an angle $\alpha$ 419 between the magnetic field vector and the flux rope axis 418 for the model in FIG. 24A using the present theory. Compare with FIG. 23B.

Figure 25:
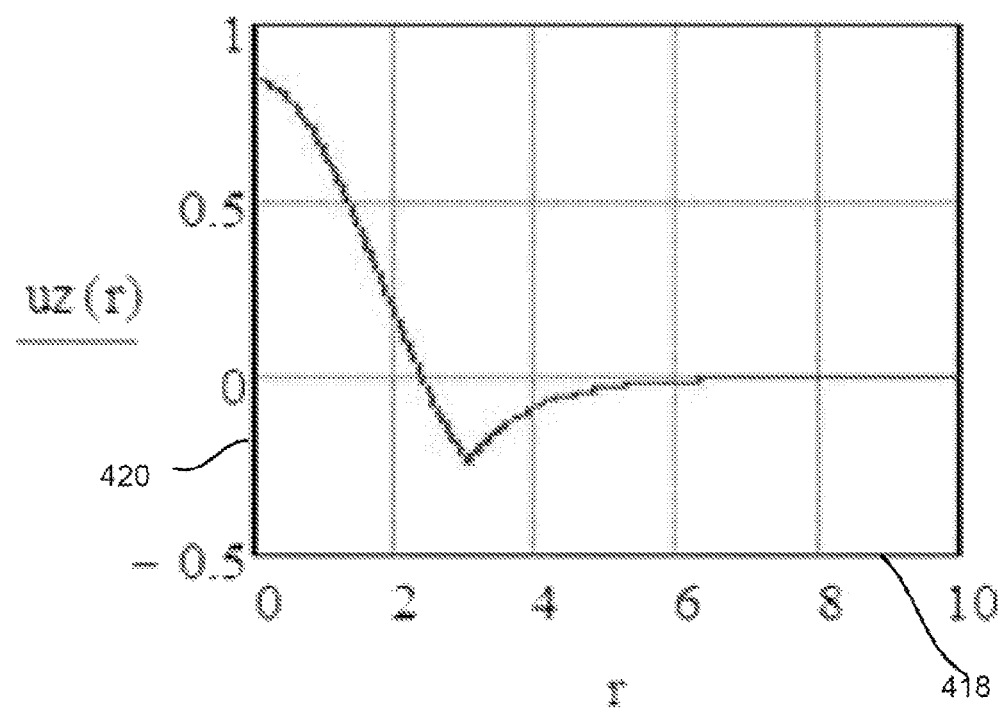
FIG. 25 shows an axial velocity to produce the poloidal magnetic field for the models of FIGS. 24A and 24B.

Venus flux rope modeling above supports the case that confinement is enabled precisely when the minor radius 212 and beta conditions are satisfied. No other outside driving force or condition is necessary. Consider the axial current density determined from the velocity $u_z(r)$. From Ampere's law one easily determines $u_z(r)$ from the profile $B_\theta(r)$. FIG. 25 shows the axial velocity (hence current) necessary to produce the poloidal (azimuthal) magnetic field for the model in FIGS. 24A and 24B using the present theory. The result is shown in FIG. 25.

FIG. 25 shows an axial velocity 420 that produces the poloidal magnetic field as a function of the flux rope axis 418 for the models of FIGS. 24A and 24B. Because the second derivative of the magnetic field component was not matched at the boundary point, there is a discontinuity in the derivative of the velocity. It is expected that this would disappear if the fully nonlinear rather than linear sets of equations has been used.

The velocity $u_z(r)$ reverses after a certain value of r (which is not the matching point) and remains negative as the distance from the center of the rope approaches infinity. If, using the above equations, one calculates the net axial current it is seen to be identically zero. This means that is the axial current flows up the rope near the axis, it then reverses and flows down the rope on the outside with the net current being zero.

Thus the rope can exist in essentially complete isolation. It needs no current coming from outside the system and establishing a footprint for the generation of the rope. The rope is an isolated system that only requires a background magnetic field from which to extract energy and drive currents. Consequently, establishing the R and beta conditions in a machine are necessary and sufficient conditions for minimum-total-energy plasma confinement.

This is further supported by consideration of the inherent instability of plasma having uniform density, magnetic field, and temperature with no current or electric fields present as long as the R and beta conditions are met.

Achieving the required minor radius 212 and beta boundary conditions are necessary and sufficient to enable the containment process. As stated earlier this is supported by three facts: first, as described earlier, USU machine observation of the diamagnetic state whenever and wherever the conditions are present; second, diamagnetism and flux-rope formation in the Venus ionosphere whenever the R and beta boundary conditions are satisfied; third, theoretical prediction that an other wise quiescent plasma is unstable to dropping into the minimum-energy state when the boundary conditions are satisfied.

The instability development of diamagnetism in the Venus ionosphere is well modeled using rectangular coordinates. Flux rope formation requires using cylindrical coordinates, however be following rectangular-coordinate development would almost certainly show similar results if cylindrical, toroidal or other coordinate systems were used. The development of a diamagnetic region of plasma through the internal, positive-feedback generation of currents from an initial state where the magnetic field, number density, and temperature are uniform in space and otherwise all plasma velocities and electric fields are zero. The critical beta values are satisfied. Assume that one species remains fixed in space with number density N. The ions will be taken to be the fixed species although the results are essentially the same if the electron species were to remain fixed as demonstrated earlier. The equations governing the system are shown below as Equation 23.

$$\partial B/\partial y = -\mu_0 N e u_x + (1/c^2)\partial E_x/\partial t$$

$$0 = -\mu_0 N e u_y + (1/c^2)\partial E_y/\partial t$$

$$\partial E_x/\partial y = \partial B/\partial t$$

$$\partial u_x/\partial t = -e(E_x + B_0 u_y)/m - \nu u_x$$

$$\partial u_y/\partial t = -e(E_y - B_0 u_x)/m - (\gamma \kappa T_0/Nm)\partial n/\partial y - \nu u_y$$

$$\partial E_y/\partial y = -ne/\epsilon_0 \qquad \text{Equation 23}$$

Determining the perturbation solution for dependent variables B, $E_x$, $E_y$, $u_x$, $u_y$, and n, each in the form $F = F'e^{\alpha t + ky}$ where F' is the amplitude of the perturbation, and $\alpha$ is the growth rate. If k is positive the functions can be coshh(ky) or sinh(ky). For exponential growth, $\alpha$ must be positive. When that occurs the functions will approach the minimum-energy solutions previously derived.

Substituting the form $F \le F'e^{\alpha t + ky}$ for each of the dependent variables into the six partial differential equations above the form one obtains six equations. The factor $e^{\alpha t + ky}$ is in each term and therefore satisfies the six equations. This results in six equations in the amplitudes B', $E_x'$, $E_y'$, $u_x'$, $u_y'$, and n'.

Use the last equation to eliminate n' in terms of $E_y'$ and make the substitutions of Equations 24, where $\omega_c$ and $\omega_p$ are the cyclotron and plasma frequencies, respectively.

$$\omega_c = eB/m,$$

$$\Lambda^2 = m/\mu_0 N e^2, \text{ and}$$

$$\omega_p = c/\Lambda, \qquad \text{Equation 24}$$

This results in the following five equations in terms of the amplitudes shown in Equations 25.

$$kc^2 B' + \alpha E_x' - \omega_p^2 m u_x'/e = 0$$

$$\alpha E_y' - \omega_p^2 m u_y'/e = 0$$

$$\alpha B' - k E_x' + (\alpha + \nu) u_x' + \omega_c u_y' = 0$$

$$eE_x'/m + (\alpha + \nu) u_x' + \omega_c u_y' = 0$$

$$e(1 - \gamma \kappa T_0 k^2 \Lambda^2/mc^2)E_y'/m - \omega_c u_x' + (\alpha + \nu) u_y' = 0. \qquad \text{Equation 25}$$

The only general solution to such a system of equations is the trivial one having all amplitudes equal to zero unless, by Cramer's Rule, the determinant of the coefficients of the amplitudes equals zero. Calculating this determinant gives the dispersion relation shown in Equation 26:

$$[\alpha \omega_p^2 + (\alpha + \nu)(\alpha^2 - k^2 c^2)][(\alpha + \nu)\alpha + \omega_p^2(1 - \gamma \kappa T_0 k^2 \Lambda^2/mc^2)] + \omega_c^2 \alpha(\alpha^2 - k^2 c^2) = 0 \qquad \text{Equation 26}$$

Equation 26 may be considered an equation for $\alpha(k)$ or $k(\alpha)$. We look for solutions having a positive growth rate $\alpha$. This would indicate an unstable system tending toward the minimum-energy state if the value of k is taken to equal to $1/\Lambda$. To simplify the equation and make it applicable especially to the Venus ionosphere, note that $\kappa T_0$ is, for the cases being considered, very small with respect to $mc^2$ so the term containing their ratio can be neglected. Then neglect the collision frequency $\nu$ as small with respect to $\alpha$. With these substitutions and simplifications the above equation can be solved for $\alpha$ as shown in Equation 27.

$$\alpha^2 = \left(\frac{\omega_p^2 + \omega_c^2}{2}\right)\left[\left(1 + \frac{4\omega_p^2 \omega_c^2}{(\omega_p^2 + \omega_c^2)^2}\right)^{1/2} - 1\right] \qquad \text{Equation 27}$$

For the Venus ionosphere at approximately 250 km altitude where the magnitude of the magnetic field (IMF) is ~100 nT, $\omega_c$~0.6/s for ions ($O^+$) and $1.8 \times 10^4$/s for electrons. Ions are the particles most likely to carry the bulk of the current. The value of $\omega_p$~$3 \times 10^4$/s. Here $\omega_p^2 \gg \omega_o^2$ consequently, from the above dispersion relation, $\alpha^2 = \omega_c^2$. The growth rate for the development of a large diamagnetic volume near the planet then is ~0.6/s. A small perturbation in the magnetic field, in 20 seconds would grow by a factor of ~200,000. The Orbiter would be in that ionospheric region for ~1500 s or more. The exponential growth rate is adequate to explain the rapid development of diamagnetism when the interplanetary magnetic field at that location has the appropriate value for such development. One might characterize the growth as explosive. It is furthermore clear that this development does not depend upon a driving force other than the presence of a magnetic field having the proper beta value. The flux ropes are entirely self-contained. Once the beta condition is satisfied, diamagnetism and flux ropes are inevitable.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a toroidal vacuum vessel with a major radius R and a minor radius $\alpha$ selected to satisfy conditions for a minimum-energy state, the toroidal vacuum vessel filled with a gas having an initial particle density n, where $n=(m\eta^2)/(a^2\mu_o e^2)$, m is a mass of an ion charge carrier, $\mu_0$ is the permeability of free space, e is the electron charge, and $\eta$ is a constant in the range of 1 to 2;
an ionizing device ionizing the gas into a plasma and heating the plasma;
a transformer inductively driving a toroidal particle current comprising an ion current and an electron current about a toroidal axis that heats the plasma and generates a poloidal magnetic field;
field coils wound poloidally about the toroidal vacuum vessel generating a toroidal magnetic field wherein a beta value for the toroidal magnetic field at a wall of the toroidal vacuum vessel is adjusted to satisfy a boundary condition for a minimum-energy state such that ion current conductivity has a free space value and the electron current conductivity is reduced by the poloidal magnetic field and the toroidal magnetic field, the ion current increasing in response to the free space value of conductivity and generating an increased poloidal magnetic field that motivates the ions radially inward toward the toroidal axis, separating the ions radially inward from the electrons, the ions contained within an inner boundary and the electrons contained within an outer boundary, and producing a radial electric field within the plasma between the radially inward ions and the radially outward electrons, the plasma contained by the radial electric field, the poloidal magnetic field, and the toroidal magnetic field within the toroidal vacuum vessel in the minimum-energy state within the outer boundary of between 1 and 2 ion depths.

2. The apparatus of claim 1, wherein the toroidal magnetic field satisfies the equation $1/\beta_\phi=1/\beta_\phi(0)[1-(1/\beta_\theta)/(1/\beta_\theta(0))]$ at the wall of the toroidal vacuum vessel where $\beta_\phi$ is a poloidal beta value, $\beta_\theta$ is a toroidal beta value, $\beta_\phi(0)$ is the value of $\beta_\phi$ when $\beta_\theta=0$ and $\beta_\theta(0)$ is the value of $\beta_\theta$ when $\beta_\phi=0$.

3. The apparatus of claim 2, wherein $1/\beta_\phi(0)$ is greater than 0 and less than 3, $\beta_\theta(0)$ is greater than 0 and less than 30.

4. The apparatus of claim 1, wherein the ionizing device is a microwave generator.

5. The apparatus of claim 4, where a plurality of microwave generators are disposed around the toroidal vacuum vessel ionize the gas.

6. The apparatus of claim 1, wherein the major radius is in the range of 30-50 centimeters (cm).

7. The apparatus of claim 1, wherein the major radius is 40 cm, the minor radius is 0.20 cm, and $\eta$ is 1.6.

8. A method for ion-mode plasma containment, comprising:
filling a toroidal vacuum vessel with a major radius R and a minor radius $\alpha$ with a gas having an initial particle density n, where $n=(m\eta^2)/(a^2\mu_o e^2)$, m is a mass of an ion charge carrier, $\mu_0$ is the permeability of free space, e is the electron charge, and $\eta$ is a constant in the range of 1 to 2;
ionizing the gas into a plasma and heating the plasma;
inductively driving a toroidal particle current comprising an ion current and an electron current about a toroidal axis that heats the plasma and generates a poloidal magnetic field;
generating a toroidal magnetic field with field coils wound poloidally about the toroidal vacuum vessel;
adjusting a beta value for the toroidal magnetic field at a wall of the toroidal vacuum vessel to satisfy a boundary condition for a minimum-energy state such that ion current conductivity has a free space value and the electron current conductivity is reduced by the poloidal magnetic field and the toroidal magnetic field;
motivating the ions radially inward toward the toroidal axis in response to an increased poloidal magnetic field generated by increased ion current, separating the ions radially inward from the electrons, the ions contained within an inner boundary and the electrons contained within an outer boundary, and producing a radial electric field within the plasma between the radially inward ions and the radially outward electrons;
containing the plasma with the radial electric field, the poloidal magnetic field, and the toroidal magnetic field within the toroidal vacuum vessel in the minimum-energy state within the outer boundary of between 1 and 2 ion depths.

9. The method of claim 8, wherein the toroidal magnetic field satisfies the equation $1/\beta_\phi=1/\beta_\phi(0)[1-(1/\beta_\theta)/(1/\beta_\theta(0))]$ at the wall of the toroidal vacuum vessel where $\beta_\phi$ is a poloidal beta value, $\beta_\theta$ is a toroidal beta value, $\beta_\phi(0)$ is the value of $\beta_\phi$ when $\beta_\theta=0$ and $\beta_\theta(0)$ is the value of $\beta_\theta$ when $\beta_\phi=0$.

10. The method of claim 9, wherein $1/\beta_\phi(0)$ is greater than 0 and less than 3, $1\beta_\theta(0)$ is greater than 0 and less than 30.

11. The method of claim 8, wherein a microwave generator ionizes the gas.

12. The method of claim 8, where a plurality of microwave generators are disposed around the toroidal vacuum vessel ionize the gas.

13. The method of claim 8, wherein the major radius is in the range of 30-50 centimeters (cm).

14. The method of claim 8, wherein the major radius is 40 cm, the minor radius is 0.20 cm, and $\eta$ is 1.6.

* * * * *